(12) United States Patent
Igasaki et al.

(10) Patent No.: US 6,348,990 B1
(45) Date of Patent: Feb. 19, 2002

(54) SPATIAL LIGHT MODULATOR AND SPATIAL LIGHT MODULATING METHOD

(75) Inventors: Yasunori Igasaki; Narihiro Yoshida; Haruyoshi Toyoda; Tsutomu Hara, all of Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/719,777

(22) PCT Filed: Jun. 17, 1999

(86) PCT No.: PCT/JP99/03225

§ 371 Date: Dec. 18, 2000

§ 102(e) Date: Dec. 18, 2000

(87) PCT Pub. No.: WO99/66368

PCT Pub. Date: Dec. 23, 1999

(30) Foreign Application Priority Data

Jun. 18, 1998 (JP) ............................. 10-171196

(51) Int. Cl.[7] ............................. G02F 1/03; G02F 1/133; G03H 1/08
(52) U.S. Cl. ....................... 359/259; 359/253; 359/251; 359/238; 359/9; 349/17
(58) Field of Search ..................... 349/17, 25; 359/253, 359/252, 251, 238, 278, 290, 291, 259, 9

(56) References Cited

U.S. PATENT DOCUMENTS 5,132,811 A * 7/1992 Iwaki et al. ................... 359/6
5,309,523 A   5/1994 Iwaki et al. ................. 382/210

FOREIGN PATENT DOCUMENTS

| JP | A-4-181226 | 6/1992 |
| JP | A-4-289837 | 10/1992 |
| JP | A 7-72503 | 3/1995 |
| JP | A-9-113928 | 5/1997 |
| JP | 02001013464 A | * 6/1999 |
| JP | A-56-67820 | 12/2000 |
| JP | 02000090270 A | * 3/2001 |

OTHER PUBLICATIONS

*Technical Report of the Institute of Electronics Information and Communication Engineers*, (Oct. 1997) p. 95–99.
"Optically addressed phase–only spatial light modulator using parallel–aligned nematic liquid crystal". LI et al. Proceedings of 20th Meeting on Lightwave Sensing Technology, Dec., 1997.

* cited by examiner

Primary Examiner—Georgia Epps
Assistant Examiner—Tim Thompson
(74) Attorney, Agent, or Firm—Oliff & Berridge, PLC

(57) ABSTRACT

A signal image is transmitted by write light from a transmission type liquid crystal element 4 to an optically-addressed type parallel-aligned nematic-liquid-crystal spatial light modulator 6. The numerical aperture $NA_L$ of a relay lens 5, the pitch P of the pixel structure of the transmission type liquid crystal element 4, and the wavelength $\lambda$ of light from the write light source 1 are set with the condition $1/2P < NA_L/\lambda < 1/P$. As a result, the signal component caused by the pixel structure can be erased. Furthermore, no degradation is generated in the entire range of the spatial frequencies of the signal image that can be produced by the transmission type liquid crystal element 4.

36 Claims, 18 Drawing Sheets

SPATIAL LIGHT MODULATOR AND SPATIAL LIGHT MODULATING METHOD

This is a national stage entry PCT/JP99/03225, international filing date Jun. 17, 1999.

TECHNICAL FIELD

The present invention relates to a spatial light modulating device which uses a spatial light modulator, which is an element for generating a particular modulation in a cross-section of a light beam, and to a spatial light modulating method which uses the spatial light modulator.

BACKGROUND ART

A spatial light modulating device is used for optical information processing and computer-generated holograms (CGH). Especially, a spatial light modulating device of a type, which prepares signal images according to electric addresses, is very useful because this type of spatial light modulating device can easily prepare those signal images. A device that can efficiently perform phase modulation is required for the above-described usage.

A device that employs a transmission type liquid crystal element can be considered as an example of this type of spatial light modulating device. Such a device has a merit of being purchasable at a relatively low price. However, such devices have been unable to achieve a phase modulation amount of greater than $2\pi$, which is required for computer-generated holograms and the like.

In an example of another device that is capable of performing electric addressing is a spatial light modulating device that employs an optically-addressed type spatial light modulator and that uses an electrically-addressed type element for generating write light that will fall incident on the optically-addressed type spatial light modulator. For example, Technical Report of the Institute of Electronics, Information and Communication Engineers, (1997–10) p95–p99, discloses a spatial light modulating device that uses a transmission type liquid crystal element as an electrically-addressed type element and an optically-addressed type parallel-aligned nematic-liquid-crystal spatial light modulator (PAL-SLM) as an optically-addressed type spatial light modulator. In this device, a relay lens is disposed between the transmission type liquid crystal element and the optically-addressed type parallel-aligned nematic-liquid-crystal spatial light modulator. Write light from the transmission type liquid crystal element passes through the relay lens to reach the optically-addressed type PAL-SLM. It is possible to attain phase modulation of $2\pi$ or greater. Because phase-only modulation can be attained, it is also possible to attain high diffraction efficiency.

There is known another method, other than using a relay lens, to transmit write light from a transmission type liquid crystal element to an optically-addressed type spatial light modulator. In this method, the output end of the transmission type liquid crystal element and the write light input end of the optically-addressed type spatial light modulator are both configured from fiber optic plates, and these two fiber optic plates are optically connected. Alternatively, the output end of the transmission type liquid crystal element and the write light input end of the optically-addressed type spatial light modulator are configured from a single fiber optic plate (Japanese Patent Application Publication No. HEI-7-72503).

However, in the case of the above-described two spatial light modulating devices, a signal component that is generated as a result of a pixel structure of the transmission type liquid crystal element is not erased. There is a problem in that a signal image to be transmitted receives influences from this signal component.

It is an objective of the present invention to overcome the above-described problem and provide a spatial light modulating device and a spatial light modulating method, which transmits, by using write light, a signal image from an electrically-addressed type element, which has a pixel structure, to an optically-addressed type spatial light modulator, and which is capable of erasing the signal component caused by the pixel structure and suppressing degrades in the signal image.

DISCLOSURE OF THE INVENTION

In order to solve the above-described problems, a spatial light modulating device of the present invention comprises: an electrically-addressed type spatial light modulator, which has a pixel structure where a plurality of pixels are arranged at a predetermined pitch P, and which is addressed by electric signals representing information to be written, thereby modulating incident write light; an optically-addressed type spatial light modulator, which has an optical addressing layer and a light modulation layer between a pair of transparent electrodes and which modulates read light incident to the light modulation layer by the write light incident to the optical addressing layer; and an optical connecting element which guides the write light, which has been modulated by the electrically-addressed type spatial light modulator and which has been outputted therefrom, to the optical addressing layer of the optically-addressed type spatial light modulator, the optical connecting element having a predetermined critical transfer spatial frequency $\upsilon_c$, the value of the critical transfer spatial frequency $\upsilon_c$ and the value of a pixel structure spatial frequency $1/P$ of the pixel structure in the electrically-addressed type spatial light modulator satisfying the following relationship: $\upsilon_c < 1/P$.

According to the spatial light modulating device described above, the relationship of $\upsilon_c < 1/P$ is established between the critical transfer spatial frequency $\upsilon_c$ and the pixel structure spatial frequency $1/P$. Accordingly, it is possible to erase, from write light that reaches the optically-addressed spatial light modulator, a signal component that is caused by the pixel structure of the electrically-addressed type spatial light modulator.

It is preferable that the value of the critical transfer spatial frequency $\upsilon_c$ of the optical connecting element and the value of the pixel structure spatial frequency $1/P$ further satisfy the relationship of $1/2P < \upsilon_c$. The spatial frequency of a signal image generated by the electrically-addressed type element is limited to be lower than or equal to the maximum spatial frequency $1/2P$ that is determined dependently on the pitch P of the pixel structure. By further applying the condition of $1/2P < \upsilon_c$ to the critical transfer spatial frequency $\upsilon_c$ and the pixel structure spatial frequency $1/P$, it is possible to transmit the write light without any degradation over the entire range of the spatial frequencies included in the signal image. It is therefore possible to attain a spatial light modulating device that can erase the signal component caused by the pixel structure and that can generate no degradation in the signal image.

In the case where the optically-addressed type spatial light modulator has sensitivity characteristic to write light wavelength, the sensitivity characteristic has a predetermined sensitivity to a predetermined wavelength $\lambda$ and has another sensitivity to a wavelength other than the predetermined wavelength $\lambda$, and the predetermined sensitivity is higher than the other sensitivity, the value of the critical transfer spatial frequency $\upsilon_c$ of the optical connecting element is preferably determined based on a numerical aperture NA of the optical connecting element and the predetermined wavelength $\lambda$. Because the value of the critical transfer spatial frequency $\upsilon_c$ is determined based on the numerical aperture NA of the optical connecting element and the predetermined wavelength $\lambda$ that mainly contributes to the modulation in the optically-addressed type spatial light modulator and because the thus determined critical transfer spatial frequency $\upsilon_c$ satisfies the relationship of $1/2P<\upsilon_c<1/P$, it is possible to attain an efficient spatial light modulating device whose output plane has very little influence from the pixel structure. The predetermined frequency $\lambda$ may be a wavelength region having a predetermined wavelength width.

It is preferable that the optical connecting element includes a relay lens that has a numerical aperture $NA_L$ at a side of the electrically-addressed type spatial light modulator, the value of the critical transfer spatial frequency $\upsilon_c$ being equal to $NA_L/\lambda$.

The optical connecting element may include a light transmission layer and a fiber optical plate which are connected with each other, the light transmission layer being connected to the electrically-addressed type spatial light modulator, the fiber optical plate being connected to the optically-addressed type spatial light modulator, the fiber optical plate having a numerical aperture $NA_{FOP}$, the light transmission layer having a thickness d and having a predetermined refractive index $n_G$ to the predetermined wavelength $\lambda$, the value of the critical transfer spatial frequency $\upsilon_c$ being substantially equal to $n_G/(d \cdot NA_{FOP})$.

According to another aspect, a spatial light modulating device of the present invention comprises: an electrically-addressed type spatial light modulator, which has a pixel structure where a plurality of pixels are arranged at a predetermined pitch P, and which is addressed by electric signals representing information to be written, thereby modulating incident write light; a relay lens for transferring the write light outputted from the electrically-addressed type spatial light modulator; and an optically-addressed type spatial light modulator, which has an optical addressing layer and a light modulation layer between a pair of transparent electrodes and which modulates read light by the write light outputted from the electrically-addressed type spatial light modulator, the optically-addressed type spatial light modulator having sensitivity characteristic to write light wavelength, the sensitivity characteristic having a predetermined sensitivity to a predetermined wavelength $\lambda$ and having another sensitivity to a wavelength other than the predetermined wavelength $\lambda$, the predetermined sensitivity being higher than the other sensitivity, the relay lens having a numerical aperture $NA_L$ at a side of the electrically-addressed type element, the value of the numerical aperture $NA_L$, the predetermined pitch P of the pixel structure in the electrically-addressed type spatial light modulator, and the predetermined wavelength $\lambda$ of the optically-addressed type spatial light modulator satisfying the following relationship: $NA_L/\lambda<1/P$.

Because the numerical aperture $NA_L$ of the relay lens satisfies the relationship of $NA_L/\lambda<1/P$ for the predetermined wavelength that mainly contributes to the modulation in the optically-addressed type spatial light modulator, it is possible to attain an efficient spatial light modulating device whose output plane has very little influence from the pixel structure. The predetermined frequency $\lambda$ may be a wavelength region having a predetermined wavelength width.

It is preferable that the value of the numerical aperture $NA_L$, at a side of the electrically-addressed type element, of the relay lens, the predetermined pitch P of the pixel structure in the electrically-addressed type element, and the predetermined wavelength $\lambda$ satisfy the following relationship: $NA_L/\lambda>1/2P$. Because the numerical aperture $NA_L$ of the relay lens further satisfies the relationship of $NA_L/\lambda>1/2P$ for the predetermined wavelength $\lambda$ or the predetermined wavelength region $\lambda$ that mainly contributes to the modulation in the optically-addressed type spatial light modulator, it is possible to attain an efficient spatial light modulating device whose output plane has substantially no degradation in the signal image.

The electrically-addressed type spatial light modulator may preferably include a transmission type liquid crystal element. By using a transmission type liquid crystal element as the electrically-addressed type element, it is possible to produce a write light that bears thereon signal images with little degradation.

The optically-addressed type spatial light modulator may preferably include an optically-addressed type spatial light modulator that uses a photoconductive layer as the optical addressing layer and that uses a liquid crystal layer as the light modulation layer. By using an optically-addressed type spatial light modulator that uses a photoconductive layer as the optical addressing layer and that uses a liquid crystal layer as the light modulation layer, it is possible to attain high diffraction efficiency.

According to another aspect, a spatial light modulating device of the present invention comprises: an electrically-addressed type spatial light modulator, which has a pixel structure where a plurality of pixels are arranged at a predetermined pitch P, and which is addressed by electric signals representing information to be written, thereby modulating incident light; and an optically-addressed type spatial light modulator, which has an optical addressing layer and a light modulation layer between a pair of transparent electrodes and which modulates read light by the write light outputted from the electrically-addressed type spatial light modulator, an output end of the electrically-addressed type spatial light modulator, that faces the optically-addressed type spatial light modulator, being constructed from a light transmission layer with a uniform refractive index, a write light input end of the optically-addressed type spatial light modulator, that faces the electrically-addressed type spatial light modulator, being constructed from a fiber optical plate which has a refractive index distribution for transferring an input image while maintaining a resolution of the input image, the light transmission layer and the fiber optical plate being optically connected with each other, the optically-addressed type spatial light modulator having sensitivity characteristic to write light wavelength, the sensitivity characteristic having a predetermined sensitivity to a predetermined wavelength $\lambda$ and having another sensitivity to a wavelength other than the predetermined wavelength $\lambda$, the predetermined sensitivity being higher than the other sensitivity, a numerical aperture $NA_{FOP}$ of the fiber optical plate, the predetermined pitch P of the pixel structure in the electrically-addressed type spatial light modulator, a thickness d of the light transmission layer, and a refractive index $n_G$ of the light transmission layer to the predetermined wavelength $\lambda$ satisfying the following relationship: $NA_{FOP}>n_G \cdot P/d$.

According to the spatial light modulating device, with using no relay lens, the light transmission layer that constitutes the output end of the electrically-addressed type spatial light modulator is optically connected to the fiber optical plate that constitutes the write light input end of the optically-addressed type spatial light modulator. With this construction, write light is transmitted. In this case, by applying the condition $NA_{FOP} > n_G \cdot P/d$ to the numerical aperture $NA_{FOP}$ of the fiber optical plate for the predetermined wavelength $\lambda$ that mainly contributes to the modulation in the optically-addressed type spatial light modulator, it is possible to erase almost all the signal component that is caused by the pixel structure, similarly to the case where the relay lens is used. The predetermined frequency $\lambda$ may be a wavelength region having a predetermined wavelength width.

It is preferable that the numerical aperture $NA_{FOP}$ of the fiber optical plate, the predetermined pitch P of the pixel structure of the electrically-addressed type element, the thickness d of the light transmission layer, and the refractive index $n_G$ of the light transmission layer to the predetermined wavelength $\lambda$ further satisfy the following relationship: $NA_{FOP} < 2n_G \cdot P/d$. By further applying the condition of $NA_{FOP} < 2n_G \cdot P/d$ to the numerical aperture $NA_{FOP}$ of the fiber optical plate for the wavelength $\lambda$ or wavelength region $\lambda$ that mainly -contributes to the modulation in the optically-addressed type spatial light modulator, it is possible to attain a spatial light modulating device that suffers from almost no degradation of the signal image, similarly to the case where the relay lens is used.

The electrically-addressed type spatial light modulator may preferably include a transmission type liquid crystal element. The optically-addressed type spatial light modulator may preferably include an optically-addressed type spatial light modulator that uses a photoconductive layer as the optical addressing layer and that uses a liquid crystal layer as the light modulation layer.

According to another aspect, a spatial light modulating device of the present invention comprises: a write light source for producing a write light; an electrically-addressed type element, which has a pixel structure where a plurality of pixels are arranged at a predetermined pitch P, which is addressed by electric signals representing information to be written, and which is inputted with the light from the write light source; a relay lens for transferring the write light which is generated by the electrically-addressed type element and which is outputted therefrom; an optically-addressed type spatial light modulator, which has an optical addressing layer and a light modulation layer between a pair of transparent electrodes; and a read light source for producing a read light for the optically-addressed type spatial light modulator, the relay lens having a numerical aperture $NA_L$ at a side of the electrically-addressed type element, the value of the numerical aperture $NA_L$, the predetermined pitch P of the pixel structure of the electrically-addressed type element, and a wavelength $\lambda$ of the light from the write light source satisfying the following relationship: $NA_L/\lambda < 1/P$.

By applying the condition of $NA_L/\lambda < 1/P$ to the numerical aperture of the relay lens, it is possible to erase, from write light that reaches the optically-addressed spatial light modulator, a signal component that is caused by the pixel structure of the electrically-addressed type element.

It is preferable that the value of the numerical aperture $NA_L$, at the electrically-addressed type element side, of the relay lens, the predetermined pitch P of the pixel structure of the electrically-addressed type element, and the wavelength $\lambda$ of the light from the write light source further satisfy the following relationship: $NA_L/\lambda > 1/2P$. By further applying the condition of $NA_L/\lambda > 1/2P$ to the numerical aperture of the relay lens, it is possible to transmit the write light without generating any degradation over the entire range of the spatial frequencies included in the signal image. It is therefore possible to attain a spatial light modulating device that can erase the signal component caused by the pixel structure and that can generate no degradation in the signal image.

It is preferable that the wavelength $\lambda$ of the light from the write light source has a wavelength width with a wavelength range of $\lambda_1 < \lambda < \lambda_2$, the value of the numerical aperture $NA_L$, at the electrically-addressed type element side, of the relay lens, the predetermined pitch P of the pixel structure of the electrically-addressed type element, and the wavelength range $\lambda_1, \lambda_2$ of the light from the write light source satisfying the following relationship: $1/2P < NA_L/\lambda_2$, $NA_L/\lambda_1 < 1/P$.

It is preferable that the electrically-addressed type element includes a transmission type liquid crystal element. It is preferable that the optically-addressed type spatial light modulator includes an optically-addressed type spatial light modulator that uses a photoconductive layer as the optical addressing layer and that uses a liquid crystal layer as the light modulation layer.

According to still another aspect, a spatial light modulating device of the present invention comprises: a write light source for producing a write light; an electrically-addressed type element, which has a pixel structure where a plurality of pixels are arranged at a predetermined pitch P, which is addressed by electric signals representing information to be written, and which is inputted with the light from the write light source; an optically-addressed type spatial light modulator, which has an optical addressing layer and a light modulation layer between a pair of transparent electrodes; and a read light source for producing a read light for the optically-addressed type spatial light modulator, an output end of the electrically-addressed type element, that faces the optically-addressed type spatial light modulator, being constructed from a light transmission layer having a uniform refractive index, a write light input end of the optically-addressed type spatial light modulator, that faces the electrically-addressed type element, being constructed from a fiber optical plate which has a refractive index distribution for transferring an input image while maintaining a resolution of the input image, the light transmission layer and the fiber optical plate being optically connected with each other, a numerical aperture $NA_{FOP}$ of the fiber optical plate, the predetermined pitch P of the pixel structure of the electrically-addressed type element, a thickness d of the light transmission layer, and a refractive index $n_G$ of the light transmission layer to a wavelength $\lambda$ of the light from the write light source satisfying the following relationship: $NA_{FOP} > n_G \cdot P/d$.

According to the spatial light modulating device, with using no relay lens, the light transmission layer that constitutes the output end of the electrically-addressed type element is optically connected to the fiber optical plate that constitutes the write light input end of the optically-addressed type spatial light modulator. With this construction, write light is transmitted. In this case, by applying the condition $NA_{FOP} > n_G \cdot P/d$ to the numerical aperture $NA_{FOP}$ of the fiber optical plate, it is possible to attain a spatial light modulating device that can erase a signal component caused by the pixel structure.

It is preferable that the numerical aperture $NA_{FOP}$ of the fiber optical plate, the predetermined pitch P of the pixel structure of the electrically-addressed type element, the thickness d of the light transmission layer, and the refractive index $n_G$ of the light transmission layer to the wavelength $\lambda$ of the light from the write light source further satisfy the following relationship: $NA_{FOP} < 2n_G \cdot P/d$.

By further applying the condition of $NA_{FOP} < 2n_G \cdot P/d$ to the numerical aperture $NA_{FOP}$ of the fiber optical plate, it is possible to attain a spatial light modulating device that can erase a signal component caused by the pixel structure and that can generate no degradation in the signal image.

It is preferable that the electrically-addressed type element includes a transmission type liquid crystal element. It is preferable that the optically-addressed type spatial light modulator includes an optically-addressed type spatial light modulator that uses a photoconductive layer as the optical addressing layer and that uses a liquid crystal layer as the light modulation layer.

According to another aspect, a spatial light modulating method of the present invention comprises the steps of: addressing, by electric signals representing information to be written, an electrically-addressed type spatial light modulator, which has a pixel structure where a plurality of pixels are arranged at a predetermined pitch P; inputting a write light with a predetermined wavelength $\lambda$ to the electrically-addressed type spatial light modulator, and guiding the write light, which has been modulated by the electrically-addressed type spatial light modulator and which has been outputted therefrom, to an optical addressing layer of an optically-addressed type spatial light modulator via an optical connecting element having a critical transfer spatial frequency $\upsilon_c$, the optically-addressed type spatial light modulator having the optical addressing layer and a light modulation layer between a pair of transparent electrodes; and inputting a read light to the light modulation layer of the optically-addressed type spatial light modulator, thereby allowing the read light to be modulated, the value of the critical transfer spatial frequency $\upsilon_c$ of the optical connecting element and the value of a pixel structure spatial frequency $1/P$ of the pixel structure in the electrically-addressed type spatial light modulator satisfying the following relationship: $\upsilon_c < 1/P$.

According to the spatial light modulating method described above, the relationship of $\upsilon_c < 1/P$ is established between the critical transfer spatial frequency $\upsilon_c$ and the pixel structure spatial frequency $1/P$. Accordingly, it is possible to erase, from write light that reaches the optically-addressed spatial light modulator, a signal component that is caused by the pixel structure of the electrically-addressed type spatial light modulator.

It is preferable that the value of the critical transfer spatial frequency $\upsilon_c$ of the optical connecting element and the value of the pixel structure spatial frequency $1/P$ satisfy the following relationship: $1/2P < \upsilon_c$. By further applying the condition of $1/2P < \upsilon_c$ to the critical transfer spatial frequency $\upsilon_c$ and the pixel structure spatial frequency $1/P$, it is possible to transmit the write light without any degradation over the entire range of the spatial frequencies included in the signal image. It is therefore possible to attain a spatial light modulating method that can erase the signal component caused by the pixel structure and that can generate no degradation in the signal image.

It is preferable that the value of the critical transfer spatial frequency $\upsilon_c$ of the optical connecting element is determined based on a numerical aperture NA of the optical connecting element and the predetermined wavelength $\lambda$.

It is preferable that the optical connecting element includes a relay lens that has a numerical aperture $NA_L$ at a side of the electrically-addressed type spatial light modulator, the value of the critical transfer spatial frequency $\upsilon_c$ being equal to $NA_L/\lambda$.

The optical connecting element may include a light transmission layer and a fiber optical plate which are connected with each other, the light transmission layer being connected to the electrically-addressed type spatial light modulator, the fiber optical plate being connected to the optically-addressed type spatial light modulator, the fiber optical plate having a numerical aperture $NA_{FOP}$, the light transmission layer having a thickness d and having a predetermined refractive index $n_G$ to the predetermined wavelength $\lambda$, the value of the critical transfer spatial frequency $\upsilon_c$ being substantially equal to $n_G/(d \cdot NA_{FOP})$.

According to another aspect, a spatial light modulating method of the present invention comprises the steps of: addressing, by electric signals representing information to be written, an electrically-addressed type element, which has a pixel structure where a plurality of pixels are arranged at a predetermined pitch P; inputting a write light with a predetermined wavelength $\lambda$ to the electrically-addressed type element, and guiding the write light, which has been modulated by the electrically-addressed type element and which has been outputted therefrom, to an optical addressing layer of an optically-addressed type spatial light modulator via a relay lens having a numerical aperture $NA_L$ at a side of the electrically-addressed type element, the optically-addressed type spatial light modulator having the optical addressing layer and a light modulation layer between a pair of transparent electrodes; and inputting a read light to the light modulation layer of the optically-addressed type spatial light modulator, thereby allowing the read light to be modulated, the value of the numerical aperture $NA_L$, at the side of the electrically-addressed type element, of the relay lens, the predetermined pitch P of the pixel structure of the electrically-addressed type element, and the wavelength $\lambda$ of the write light satisfying the following relationship: $NA_L/\lambda < 1/P$.

According to the spatial light modulating method, by applying the condition of $NA_L/\lambda < 1/P$ to the numerical aperture of the relay lens, it is possible to erase, from write light that reaches the optically-addressed spatial light modulator, a signal component that is caused by the pixel structure of the electrically-addressed type element.

It is preferable that the value of the numerical aperture $NA_L$, at the electrically-addressed type element side, of the relay lens, the predetermined pitch P of the pixel structure of the electrically-addressed type element, and the wavelength $\lambda$ of the light from the write light source further satisfy the following relationship: $NA_L/\lambda > 1/2P$. By further applying the condition of $NA_L/\lambda > 1/2P$ to the numerical aperture of the relay lens, it is possible to transmit the write light without any degradation over the entire range of the spatial frequencies included in the signal image. It is therefore possible to attain a spatial light modulating method that can erase the signal component caused by the pixel structure and that can generate no degradation in the signal image.

It is preferable that the write light inputting step includes the step of inputting write light having a wavelength width with a wavelength range of $\lambda_1 < \lambda < \lambda_2$ to the electrically-addressed type element, the value of the numerical aperture $NA_L$, at the electrically-addressed type element side, of the relay lens, the predetermined pitch P of the pixel structure of the electrically-addressed type element, and the wavelength range $\lambda_1$, $\lambda_2$ of the write light satisfying the following relationship: $1/2P < NA_L/\lambda_2$, $NA_L/\lambda_1 < 1/P$.

It is preferable that the electrically-addressed type element includes a transmission type liquid crystal element. It is preferable that the optically-addressed type spatial light modulator includes an optically-addressed type spatial light modulator that uses a photoconductive layer as the optical addressing layer and that uses a liquid crystal layer as the light modulation layer.

According to still another aspect, a spatial light modulating method of the present invention comprises the steps of: addressing, by electric signals representing information to be written, an electrically-addressed type element, which has a pixel structure where a plurality of pixels are arranged at a predetermined pitch P; inputting a write light with a predetermined wavelength λ to the electrically-addressed type element, and guiding the write light, which has been modulated by the electrically-addressed type element and which has been outputted therefrom, to an optical addressing layer of an optically-addressed type spatial light modulator, via a light transmission layer, which has a thickness d and which has a refractive index $n_G$ to the predetermined wavelength λ, and a fiber optical plate, which has a numerical aperture $NA_{FOP}$, the optically-addressed type spatial light modulator having the optical addressing layer and a light modulation layer between a pair of transparent electrodes; and inputting a read light to the light modulation layer of the optically-addressed type spatial light modulator, thereby allowing the read light to be modulated, the numerical aperture $NA_{FOP}$ of the fiber optical plate, the predetermined pitch P of the pixel structure of the electrically-addressed type element, the thickness d of the light transmission layer, and the refractive index $n_G$ of the light transmission layer to the predetermined wavelength λ of the write light satisfying the following relationship: $NA_{FOP} > n_G \cdot P/d$.

According to the spatial light modulating method, with using no relay lens, the light transmission layer that constitutes the output end of the electrically-addressed type element is optically connected to the fiber optical plate that constitutes the write light input end of the optically-addressed type spatial light modulator. With this construction, write light is transmitted. In this case, by applying the condition $NA_{FOP} > n_G \cdot P/d$ to the numerical as aperture $NA_{FOP}$ of the fiber optical plate, it is possible to erase the signal component caused by the pixel structure, similarly to the case where the relay lens is used.

It is preferable that the numerical aperture $NA_{FOP}$ of the fiber optical plate, the predetermined pitch P of the pixel structure of the electrically-addressed type element, the thickness d of the light transmission layer, and the refractive index $n_G$ of the light transmission layer to the predetermined wavelength λ of the write light further satisfy the following relationship: $NA_{FOP} < 2n_G \cdot P/d$. By further applying the condition of $NA_{FOP} < 2n_G \cdot P/d$ to the numerical aperture $NA_{FOP}$ of the fiber optical plate, it is possible to attain a spatial light modulating method that can erase the signal component caused by the pixel structure and that suffers from no degradation of the signal image.

It is preferable that the electrically-addressed type element includes a transmission type liquid crystal element. It is preferable that the optically-addressed type spatial light modulator includes an optically-addressed type spatial light modulator that uses a photoconductive layer as the optical addressing layer and that uses a liquid crystal layer as the light modulation layer.

BRIEF DESCRIPTION OF THE DRAWINGS

FIG. 23($b$) is a configurational diagram showing another form of use of the spatial light modulating device according to the second embodiment of the present invention.

BEST MODE FOR CARRYING OUT THE INVENTION

Figure 1:
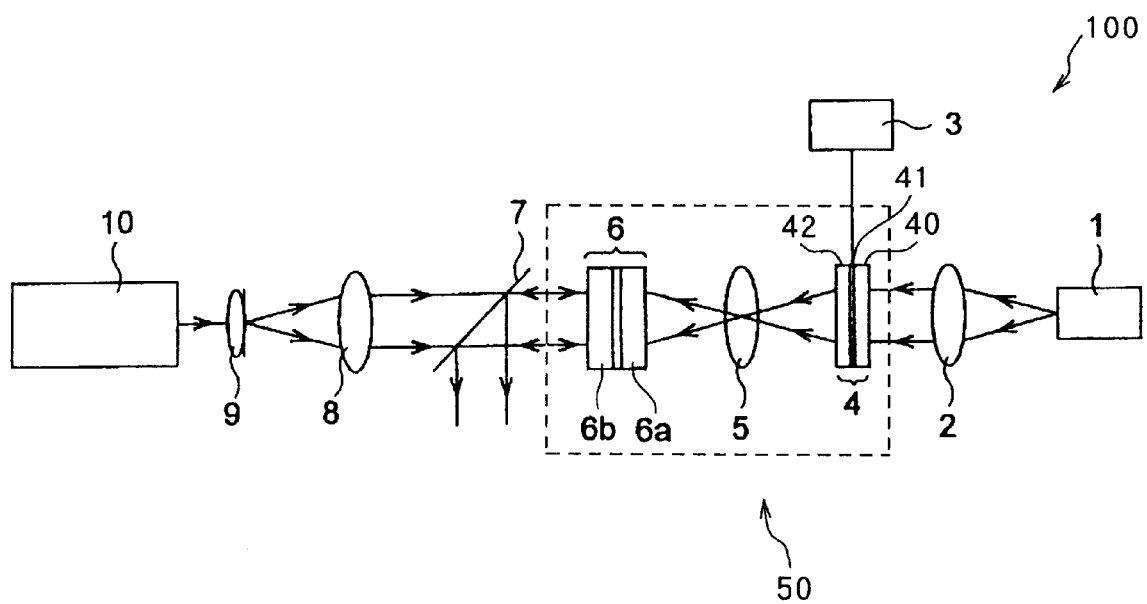
FIG. 1 is a configurational diagram of a spatial light modulating device according to a first embodiment of the present invention.

Spatial light modulating devices according to embodiments of the present invention will be explained based on FIGS. 1 to 23($b$).

It should be noted that in the explanation of the drawings, the same elements are applied with the same numbering and redundant explanation is omitted. Also the dimensional rates used in the drawings do not always much those described.

First, a spatial light modulating device 100 according to a first embodiment of the present invention will be explained based on FIGS. 1 to 19.

FIG. 1 shows a configurational drawing of the spatial light modulating device 100 according to the first embodiment of the present invention.

The spatial light modulating device 100 of the present embodiment is provided with an electrically-addressed type spatial light modulating device 50. The electrically-addressed type spatial light modulating device 50 includes an electrically-addressed type element 4 and an optically-addressed type spatial light modulator 6 that are optically connected by a relay lens 5, which serves as an optical connection element. The spatial light modulating device 100 according to the present embodiment further includes a write light source 1 and a collimator lens 2 for irradiating write light onto the electrically-addressed type spatial light modulating device 50, and a read light source 10, a spatial filter 9, a lens 8, and a half mirror 7 for irradiating read light onto the electrically-addressed type spatial light modulating device 50.

The electrically-addressed type spatial light modulating device 50 includes an electric signal generator 3 which is electrically connected to the electrically-addressed type element 4 and which drives to electrically address the electrically-addressed type element 4. Write light from the write light source 1 falls incident on the electrically-addressed type element 4 through the collimator lens 2. The write light modulated by the electrically-addressed type element 4 and outputted therefrom is irradiated on the optically-addressed type spatial light modulator 6 through the relay lens 5. Read light from the read light source 10 is irradiated onto the optically-addressed type spatial light modulator 6 through the spatial filter 9, the lens 8, and the half mirror 7. The read light modulated by the optically-addressed type spatial light modulator 6 is outputted from the optically-addressed type spatial light modulator 6, and is reflected on the half mirror 7 so as to be outputted from the spatial light modulating device 100.

An image calculated by a computer or a computer-generated hologram are examples of information to be transmitted using the spatial light modulating device 100 having the above-described configuration. The electric signal generator 3 converts such information into a video signal or a RGB signal, for example, and supplies it to the transmission type liquid crystal element 4.

The electrically-addressed type element 4 is for generating a signal image according to the supplied video signal. A transmission type liquid crystal element, a reflection type liquid crystal element, and the like are conceivable examples of the electrically-addressed type element 4. However, according to the present embodiment, a transmission type liquid crystal element (liquid crystal display (LCD)) 4, which has no image distortion and which has high contrast characteristics, is used. It is noted that the electrically-addressed type element 4 is formed from a light incident layer 40, a light modulation layer 41, and a light transmission layer 42. The light modulation layer 41 is connected to the electric signal generator 3 and is driven to be electrically addressed. Light emitted from the write light source 1 is collimated by the collimator lens 2 and irradiated, as collimated light, on the light modulation layer 41 through the light incident layer 40 of the transmission type liquid crystal element 4. The light modulation layer 41, which is driven to be electrically addressed, modulates the collimated light to generate write light for transmitting a signal image. In this way, the write light bearing the signal image thereon is transmitted to the light transmission layer 42 and outputted therefrom.

The optically-addressed type spatial light modulator 6 is for modulating read light from the read light source 10 using the signal image generated by the electrically-addressed type element 4. The optically-addressed type spatial light modulator 6 has a write portion 6a and a read portion 6b. The optically-addressed type spatial light modulator 6 is optically coupled to the transmission type liquid crystal element 4 through the relay lens 5. Write light outputted from the transmission type liquid crystal element 4 passes through the relay lens 5 and falls incident on the write portion 6a of the optically-addressed type spatial light modulator 6, where the write light is imaged. The relay lens 5 has a numerical aperture $NA_L$ at a side of the transmission type liquid crystal element 4. The optically-addressed type spatial light modulator 6 is disposed so that the read light emitted from the read light source 10 passes through the spatial filter 9, the lens 8, and the half mirror 7 and falls incident on the read portion 6b. The read portion 6b modulates the read light according to information in the signal image that is incident on the write portion 6a. The read light is reflected at the boundary between the write portion 6a and the read portion 6b, outputted as a modulated image, and reflected in a predetermined direction by the half mirror 7 so as to be outputted.

The modulated image outputted in this way is subjected to optical processes according to the usage objected. For example, when it is desired to obtain a Fourier transformed image of the modulated image, then as shown in FIG. 5(a), the light outputted from the half mirror 7 is spatially Fourier transformed by the Fourier transform lens 11 and a Fourier transformed image is formed on the Fourier plane 12, which is the back focal plane of the Fourier transform lens 11. When it is desired to display an image of the modulated image, then as shown in FIG. 5(b), the light outputted from the half mirror 7 is imaged by an imaging lens 13 onto its image plane 15.

Figure 2:
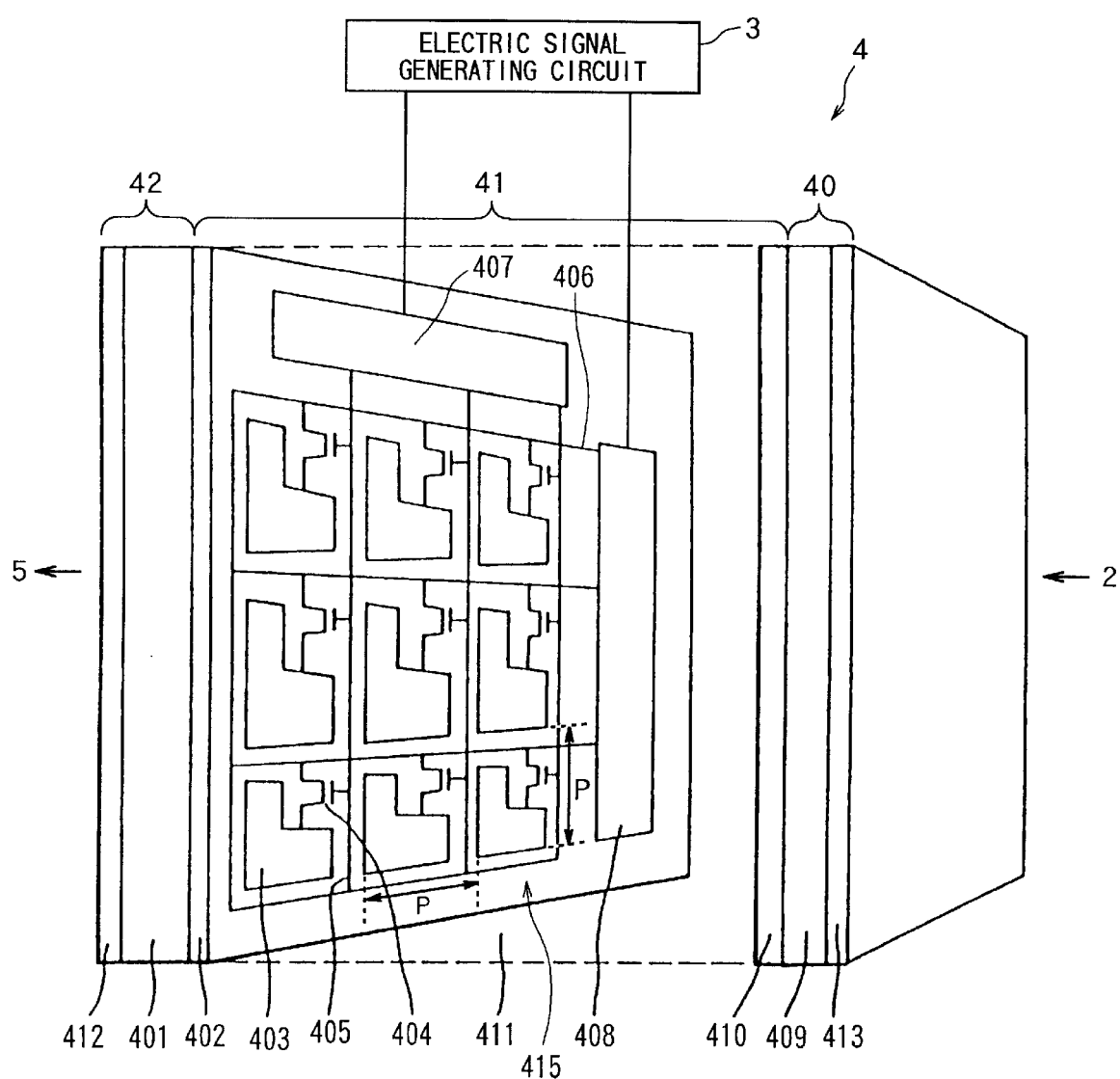
FIG. 2 is an enlarged perspective configurational diagram showing a configuration of a transmission type liquid crystal element in the spatial light modulating device according to the first embodiment.

Next, while referring to FIG. 2, a detailed explanation will be provided for configuration of the electrically-addressed type transmission liquid crystal element 4.

The electrically-addressed type transmission liquid crystal element 4 is configured from the light incident layer 40, the light modulation layer 41, and the light transmission layer 42 as described above. The light incident layer 40 is configured from a transparent glass substrate 409, and a polarizing plate 413. The light transmission layer 42 is configured from another transparent glass substrate 401 and another polarizing plate 412. The light modulation layer 41 is configured from a counter electrode 410, a silicon single crystal film 402, and a twisted nematic liquid crystal layer 411. The counter electrode 410 is formed on the transparent glass substrate 409. The silicon single crystal film 402 is formed on the transparent glass substrate 401. The twisted nematic liquid crystal layer 411 is formed between the counter electrode 410 and the silicon single crystal film 402.

Figure 3:
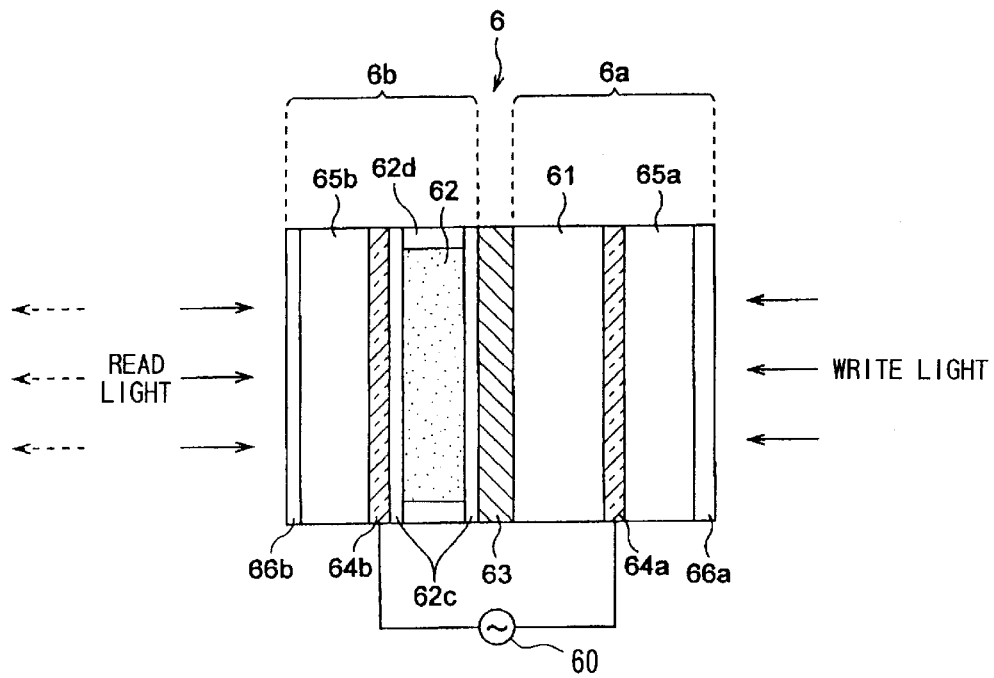
FIG. 3 is an enlarged configurational drawing showing a configuration of an optically-addressed type parallel-aligned nematic-liquid-crystal spatial light modulator in the spatial light modulating device of the first embodiment.
Figure 4:
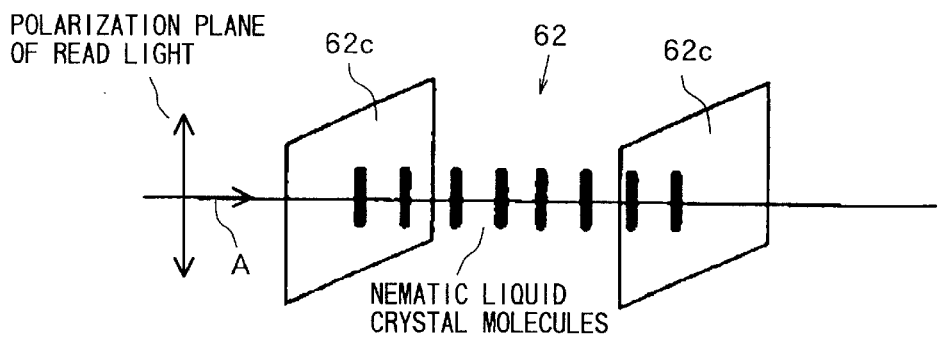
FIG. 4(a) is an explanatory view showing aligned condition of liquid crystal molecules in a liquid crystal layer of the optically-addressed type parallel-aligned nematic-liquid-crystal spatial light modulator of FIG. 3.
FIG. 4(b) is an explanatory view showing a situation when the liquid crystal molecules of FIG. 4(a) have their alignment condition changed.
Figure 4:
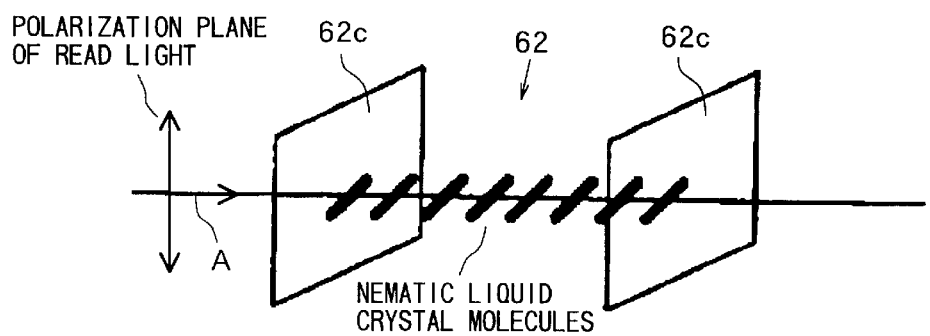
Figure 5:
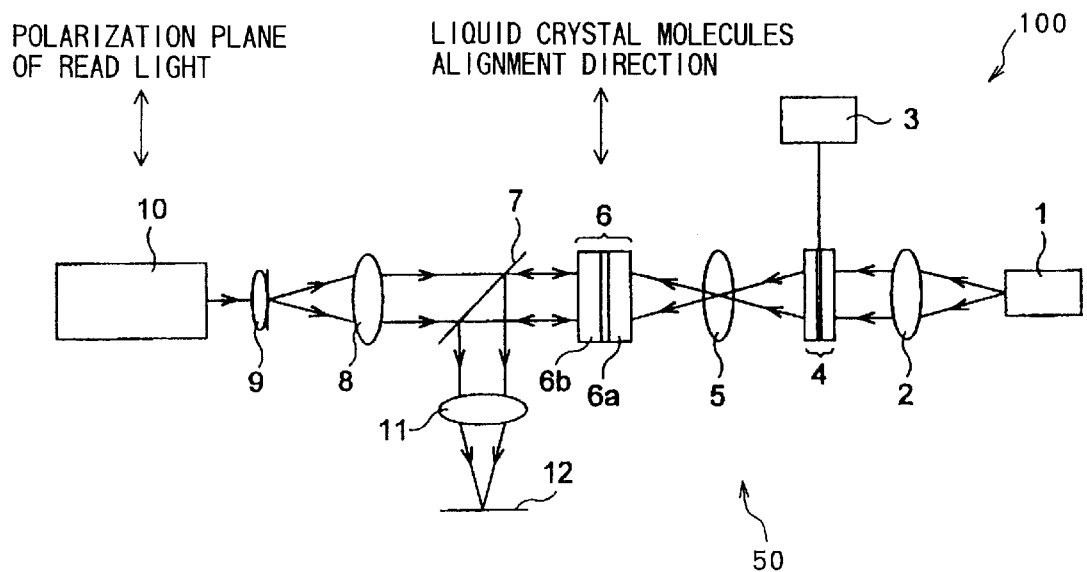
FIG. 5(a) is a configurational view showing a form of use of the spatial light modulating device according to the first embodiment of the present invention.
FIG. 5(b) is a configurational view showing an another form of use of the spatial light modulating device of the first embodiment of the present invention.
Figure 5:
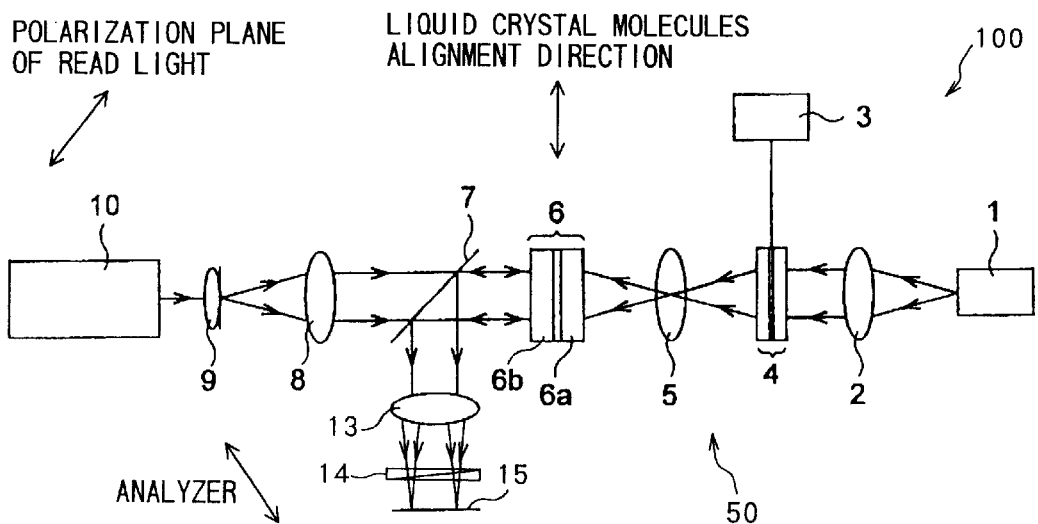

A pixel structure 415 having a predetermined pitch P is formed on the silicon single crystal film 402. Explained more detail, a plurality of transparent pixel electrodes 403 are arranged in a two dimensional matrix at the pitch P on the silicon single crystal film 402. It should be noted that although nine transparent pixel electrodes 403 are shown in FIG. 3, a greater number of transparent pixel electrodes 403 are actually provided. A switching element 404 formed from a thin film transistor TFT is connected to each transparent pixel electrode 403. Each switching element 404 is covered by a light blocking mask (not shown). Each transparent pixel electrode 403 functions as an opening portion with respect to write light. Each switching element 404 functions as a light blocking portion for blocking write light. With this configuration, the pixel structure 415 is formed with opening portions 403 arranged at the pitch P.

Each switching element 404 is connected to a scan circuit 407 and a signal circuit 408 through a scan line 405 and a signal line 406. The scan circuit 407 and the signal circuit 408 are connected to the electric signal generating circuit 3. With this configuration, the scan circuit 407 and the signal circuit 408 generate a scan signal and an image signal according to a video signal supplied from the electric signal generating circuit 3, and drive a desired switching element 404 by the scan signal and the image signal, to select a corresponding pixel 403. With the above-described configuration, the liquid crystal layer 411 changes alignment of liquid crystal molecules in the region, between the counter electrode 410 and the pixels 403 that are selectively driven by the video signal from the electric signal generator 3, thereby modulating the polarization state of the incident write light accordingly. By operation of the polarizing plates 412 and 413, the intensity of the write light is modulated so that a corresponding signal image is borne on the write light.

Next, detailed explanation for configuration of the optically-addressed type spatial light modulator 6 will be explained while referring to FIG. 3. It should be noted that an optically-addressed type parallel-aligned nematic-liquid-crystal spatial light modulator (PAL-SLM) is used as the optically-addressed type spatial light modulator 6 of the present embodiment.

The optically-addressed type parallel-aligned nematic-liquid-crystal spatial light modulator 6 has the write portion 6a and the read portion 6b which are separated from each other by a dielectric multilayer film mirror 63. The write portion 6a is configured from a photoconductive layer 61, a transparent electrode 64a, a transparent substrate 65a which serves as a write light input end, and an anti-reflection coating 66a. The transparent substrate 65a is desirably made from glass. The write light from the relay lens 5 will pass through the transparent substrate 65a and irradiate on the photoconductive layer 61. The photoconductive layer 61 is preferably made from amorphous silicon. The crystal structure of the photoconductive layer 61 will reversibly change when irradiated with light in a particular wavelength region, that is, the wavelength region of about 600 to 700 nm in this case. The photoconductive layer 61 presents photoconductivity, by changing impedance, according to changes in brightness of the incident light, to present electric conductivity. It should be noted that if necessary, a light blocking layer can be imposed between the photoconductive layer 61 and the dielectric multilayer film mirror 63.

The read portion 6b is configured from a liquid crystal layer 62, a transparent electrode 64b, a transparent substrate 65b, and an anti-reflection coating 66b. The transparent substrate 65b serves as a read light input end and is preferably made from glass. It is desirable to use nematic liquid crystal as the liquid crystal layer 62. The liquid crystal layer 62 is disposed and fixed by alignment layers 62c and spacers 62d. Polyimide or the like, for example, is used as the alignment layers 62c which are positioned on both sides of the liquid crystal layer 62. By the alignment layers 62c, liquid crystal molecules of the liquid crystal layer 62 are uniformly aligned in parallel with the transparent electrodes 64a, 64b without being twisted. Accordingly, in an off condition wherein no write light falls incident on the photoconductive layer 61, liquid crystal molecules are aligned in parallel without any twisting as shown in FIG. 4(a).

It is desirable that indium-tin-oxide (ITO) is used for the transparent electrodes 64a and 64b. The transparent electrodes 64a, 64b are connected to an alternating current power source 60. An alternating current voltage of several volts is applied between the transparent electrodes 64a and 64b. A multilayer film that is formed to reflect light of a predetermined wavelength region, corresponding to the wavelength of the read light, is used as the dielectric multilayer film mirror 63. As a result, read light is reflected to be outputted.

When write light falls incident on the write portion 6a in the optically-addressed type parallel-aligned nematic-liquid-crystal spatial light modulator with the above-described configuration, the crystal structure of the photoconductive layer 61 changes so that the electric resistance changes. Because an alternating voltage of several volts is applied between the transparent electrodes 64a, 64b, when the electrical resistance of the photoconductive layer 61 changes, the voltage applied to the liquid crystal layer 62 also changes. The change in voltage applied to the liquid crystal layer 62 tilts the liquid crystal molecules, in the liquid crystal layer 62, in the propagation direction A of the read light as shown in FIG. 4(b). The change in the refractive index of the liquid crystal layer 62, which is generated by this change, is known as the Electrically Controlled Birefringence (ECB) effect. When the read light propagates through the liquid crystal layer 62, the electrically controlled birefringence effect modulates phase of the polarization plane, of the read light, that is parallel with the alignment direction of the liquid crystal molecules. The change in the refractive index, however, does not occur phase modulation in the other polarization plane that is perpendicular with the alignment direction of the liquid crystal molecules. The read light reflects off the dielectric multilayer film mirror 63, again propagates through the liquid crystal layer 62, and outputs as a phase-modulated image through the transparent substrate 65b and the anti-reflection coating 66b.

The optically-addressed type parallel-aligned nematic-liquid-crystal spatial light modulator 6 with this configuration can perform phase-only modulation onto the read light when the polarization direction of the read light from the read light source 10 is parallel with the alignment direction of the liquid crystal molecules of the liquid crystal layer 62. When the polarization direction of the read light from the read light source 10 is tilted by 45 degrees with respect to the alignment direction of the liquid crystal molecules of the liquid crystal layer 62, the polarization plane of the read light changes. Accordingly, an intensity-modulated output can be obtained by placing a polarizer at the output side.

Next, an explanation will be provided for operations of the spatial light modulating device 100 having the above-described configuration.

The electric signal generating circuit 3 outputs an electric video signal, relating to desired signal information, and drives to address the transparent pixel electrodes 403 using the scan circuit 407 and the signal circuit 408. The write light from the write light source 1 is collimated by the collimator lens 2 and irradiated on the liquid crystal layer 411 through the light incident layer 40 of the electrically-addressed type element 4. The write light is modulated in the liquid crystal layer 411 and outputted through the light transmission layer 42. The desired signal image is borne on the outputted write light. In other words, at this time, the electrically-addressed type element 4 displays the desired signal image. In this way, the write light for transmitting the signal image is generated.

Write light modulated by the electrically-addressed type element 4 and outputted therefrom as described above is guided to the photoconductive layer 61 of the optically-addressed type spatial light modulator 6 by the relay lens 5. When the read light from the read light source 10 falls incident on the liquid crystal layer 62, the read light is modulated in accordance with the write light irradiated on the optical addressing layer 61, and is outputted. The read light is reflected by the half mirror 7 and outputted from the spatial light modulating device 100.

When it is desired to use the spatial light modulating device 100 for measuring diffraction phenomenon of signal images, then as shown in FIG. 5(a), the spatial light modulating device 100 is connected to a Fourier transform lens 11. That is, light outputted from the half mirror 7 is Fourier transformed by the Fourier transform lens 11 and the obtained Fourier transformed image is observed on the Fourier plane 12. In this case, the electrically-addressed type spatial light modulating device 50 is operated to perform phase only modulation onto the read light. In concrete terms, when the read light source 10 emits linearly-polarized read light, the read light source 10 is disposed so that a polarization direction of the read light is parallel with the liquid crystal alignment direction of the liquid crystal layer 62, that is, with the liquid crystal alignment direction in the off condition shown in FIG. 4(a). As a result, the liquid crystal layer 62 modulates the read light in phase only. The phase-only modulated read light forms a diffraction image with a high diffraction efficiency on the Fourier plane 12. It should be noted that a polarizer can be disposed behind the read light source 10.

On the other hand, when it is desired to use the spatial light modulating device 100 as a signal image projection display or the like, then as shown in FIG. 5(b), the spatial light modulating device 100 is connected to an imaging lens (magnification lens, for example) 13 and an analyzer 14. That is, the light outputted from the half mirror 7 passes through the imaging lens 13 and the analyzer 14, and the signal image obtained on the image plane 15 is observed. In this case, the electrically-addressed type spatial light modulating device 50 is operated to perform intensity modulation on the read light. In concrete terms, when the read light source 10 emits linearly-polarized read light, the read light source 10 is disposed so that the polarization direction of the read light is tilted at 45 degrees with respect to the liquid crystal alignment direction of the liquid crystal layer 62, that is, with the liquid crystal alignment direction in the off condition shown in FIG. 4(a). As a result, the liquid crystal layer 62 modulates the polarization plane of the read light. The analyzer 14 is disposed in a cross nicol orientation so that its polarization direction is shifted 90 degrees from the read light source 10. By disposing the analyzer 14 in the cross nicol alignment, a signal image of the intensity-modulated read light is formed on the imaging plane 15. It should be noted that a polarizer can be disposed behind the read light source 10.

In the present embodiment, the transmission type liquid crystal element 4 has the pixel structure 415 where the transparent pixel electrodes 403 are arranged at the pitch P as shown in FIG. 2. Accordingly, the maximum spatial frequency of the signal image that can be generated and transmitted by the transmission type liquid crystal element 4 (spatial frequency of an image where white and black is displayed in alternation by the transparent pixel electrodes 403 of the pixel structure 415) is 1/2P. On the other hand, the spatial frequency of a signal component that is caused by the transparent pixel electrodes 403, which constitute the pixel structure 415, is 1/P, which is two times as high as the maximum spatial frequency of the signal image.

Here, a detailed explanation will be provided for how the relay lens 5, in the electrically-addressed type spatial light modulating device 50 of the present embodiment, transmits the signal image from the transmission type liquid crystal element 4 to the optically-addressed type spatial light modulator 6.

Figure 6:
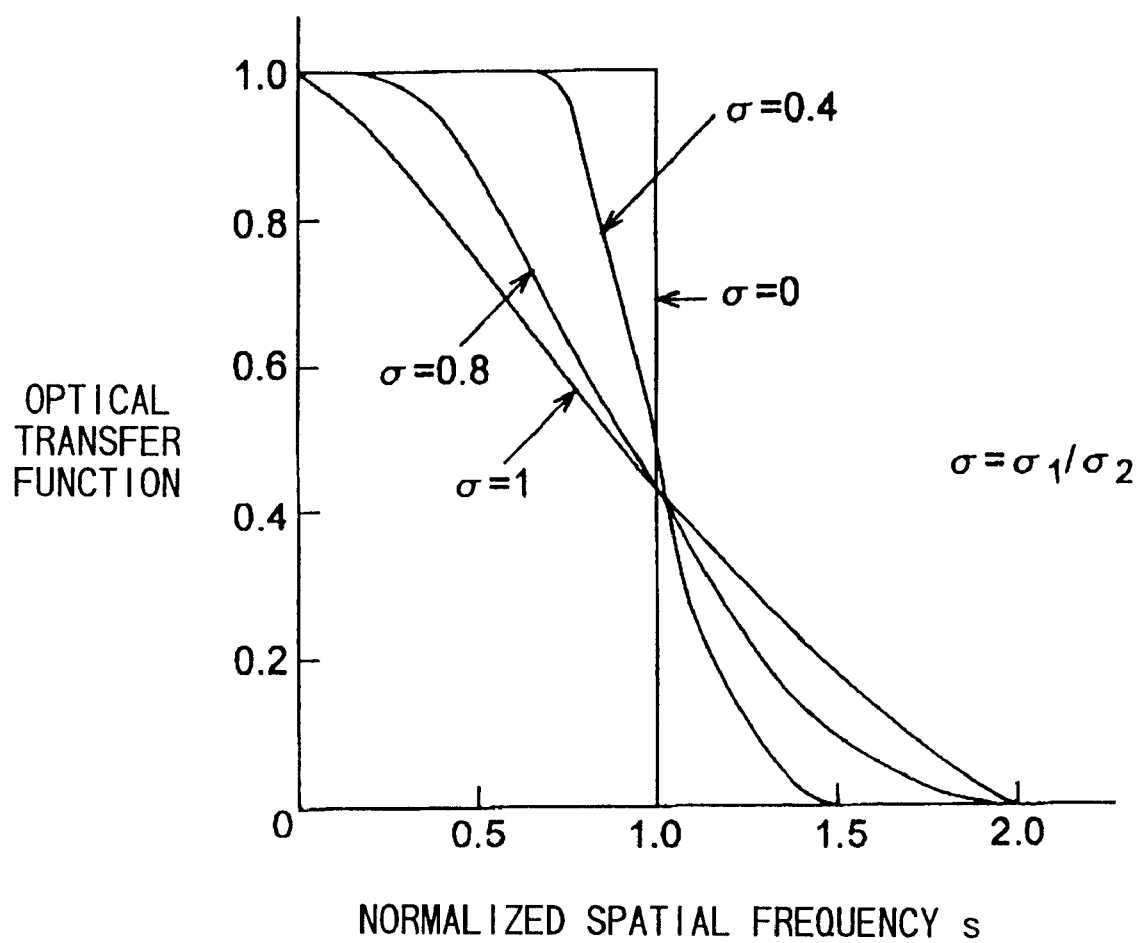
FIG. 6 is a graph indicating optical transfer function curves for a stigmatic lens.

FIG. 6 shows optical transfer function (OTF) of an ideal stigmatic lens for various values of σ. Here, the numerical aperture of an incident optical system is set to $\sigma_1$. The numerical aperture of the lens system is set to $\sigma_2$. In this case, $\sigma_2$ corresponds to the numerical aperture $NA_L$, at the electrically-addressed type element 4 side, of the relay lens 5. It is noted that scan generally be defined as $\sigma=\sigma_1/\sigma_2$. The horizontal axis denotes a normalized spatial frequency s, which is defined using the spatial frequency υ as $s=\upsilon\cdot\lambda/\sigma_2$. Here, λ is the wavelength of the write light from the write light source 1.

It is noted that with respect to the spatial frequency, a critical spatial frequency $\upsilon_c$ that corresponds to the normalized spatial frequency s=1 is defined as $\upsilon_c=NA_L/\lambda$. Components that have a spatial frequency greater than the critical spatial frequency $\upsilon_c$ result in an optical transfer function of about zero, so is difficult to transmit. On the other hand, components that have a spatial frequency of less than $\upsilon_c$, result in an optical transfer function of about one, so is easily transmitted.

Accordingly, in the present embodiment, the numerical aperture $NA_L$ at the electrically-addressed element side of the relay lens 5 and the wavelength λ of the write light source 1 are determined based on the value of the pitch P of the pixel structure 415, so that the critical spatial frequency $\upsilon_c$ (=$NA_L/\lambda$) will be set for the pitch P of the pixel structure. In concrete terms, by setting the critical spatial frequency $\upsilon_c = NA_L/\lambda$ to smaller than the spatial frequency 1/P of the pixel structure component ($NA_L/\lambda < 1/P$), the signal component (noise) that is caused by the pixel structure 415 can be erased without being transmitted. Also, by setting the critical spatial frequency $\upsilon_c = NA_L/\lambda$ to larger than the maximum spatial frequency 1/2P of the signal component ($1/2P < NA_L/\lambda$), the signal image can be transmitted without any degradation.

The present embodiment will be explained in more detail below using examples. However, the embodiment is not limited to the following examples.

FIRST EXAMPLE

A transmission type liquid crystal element 4 having a pixel number of 640×480, the pitch P in the pixel structure 415 of 40 μm, and the diagonal size of 32 mm, is used as the transmission type liquid crystal element 4 of FIG. 2. A semiconductor laser with wavelength λ of 680 nm was used as the write light source 1. A He—Ne laser with wavelength λ of 633 nm was used as the read light source 10. The spatial frequency of the signal component that is caused a by the pixel structure 415 is 1/P=25 [lp/mm (=line pairs per millimeter)]. The maximum spatial frequency of the signal image is 1/2P=12.5 [lp/mm]. The relay lens 5 with an imaging magnification rate of 1.0 and with a numerical aperture $NA_L$ of 0.013 was used. In this case, $NA_L/\lambda = 19$ [1/mm] and therefore the numerical aperture $NA_L$ fulfills the condition of $1/2P < NA_L/\lambda < 1/P$.

Figure 7:
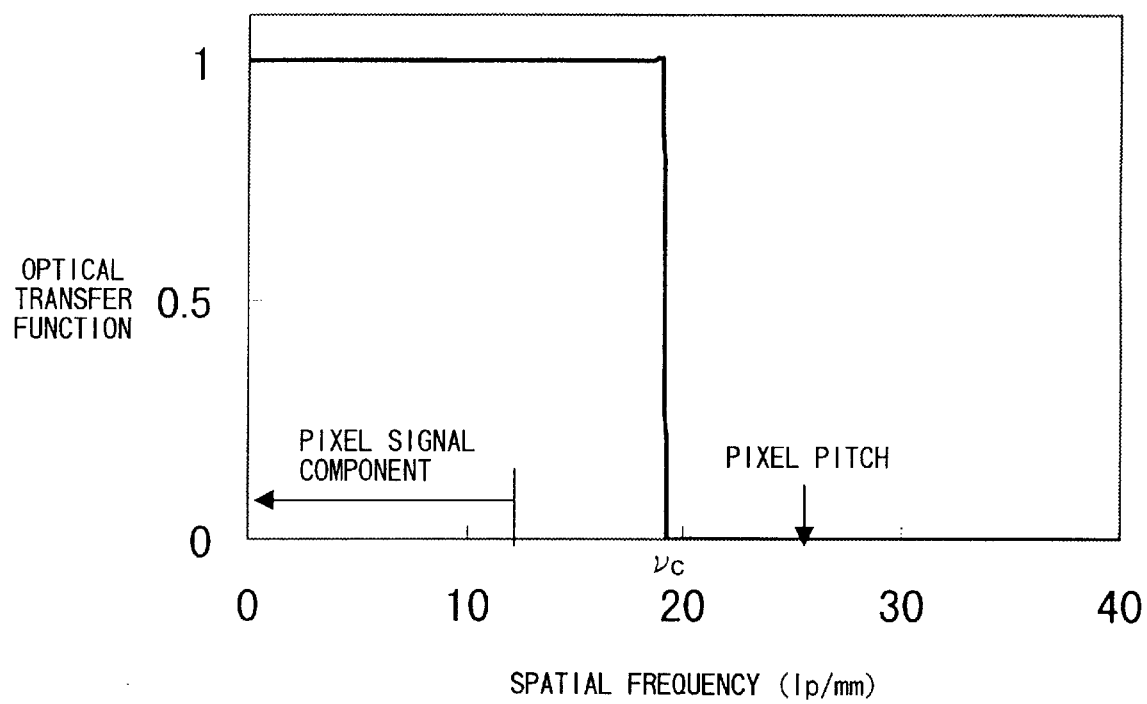
FIG. 7 is a graph showing an optical transfer function curve of a lens according to a first example of the first embodiment.

According to the present example, the numerical aperture of the relay lens 5 is a small value of $NA_L = 0.013$. The characteristic of the relay lens 5 can be considered substantially the same as that of a stigmatic lens. The collimator lens 2 collimates light from the semiconductor laser 1 into parallel rays. Also, the area of the light emitting surface of the semiconductor laser 1 is extremely small and can be considered as a point light source. For these reasons, a parallel light illumination with extremely high precision is realized. In such an illumination, the value $\sigma_1$, is substantially zero, so that σ a is substantially zero. Accordingly, the optical transfer function of the relay lens 5 of the present example can be considered to be the case of σ=0 as indicated in FIG. 6. In this case, with respect to components having the spatial frequency larger than critical spatial frequency $\upsilon_c = NA_L/\lambda$ that corresponds to the normalized spatial frequency s=1, the optical transfer function is completely zero so that these components are completely untransmitted by such an optical system. On the other hand, with respect to other components having a spatial frequency smaller than the critical spatial frequency $\upsilon_c = NA_L/\lambda$, the optical transfer function becomes completely 1, so that signal images are completely transmitted with no degradation by such an optical system. Accordingly, in the case of the present example, the optical transfer function of the relay lens 5 becomes OTF=1.0 in the region having a spatial frequency equal to or less than the critical spatial frequency $\upsilon_c$ (=$NA_L/\lambda$) and becomes OTF =0.0 in the region having a spatial frequency equal to or greater than the critical spatial frequency $\upsilon_c$ as shown in FIG. 7. In the present example, $\upsilon_c = NA_L/\lambda = 19$ [1p/mm]. Therefore, the signal component caused by the pixel structure, which has spatial frequency of 25 [lp/mm], is completely erased without being transmitted. On the other hand, because the signal image is formed at a spatial frequency of equal to or less than 12.5 [lp/mm], the signal image is completely transmitted without any degradation.

Experiments were performed with respect to transmission of an optical image by the spatial light modulating device 100 of the present example.

Figure 8:
FIG. 8 is an image which is magnified to about five times and picked up by a CCD camera to show a pattern displayed on a transmission type liquid crystal element 4 during experiments performed according to the first example of the first embodiment.

First, an image shown in FIG. 8 was displayed on the transmission type liquid crystal element 4 with the above-described pixel structure pitch P of 40 microns. It should be noted that FIG. 8 is an image diagram picked up by a CCD camera after magnifying the pattern displayed on the transmission type liquid crystal element 4 by about five times.

Figure 9:
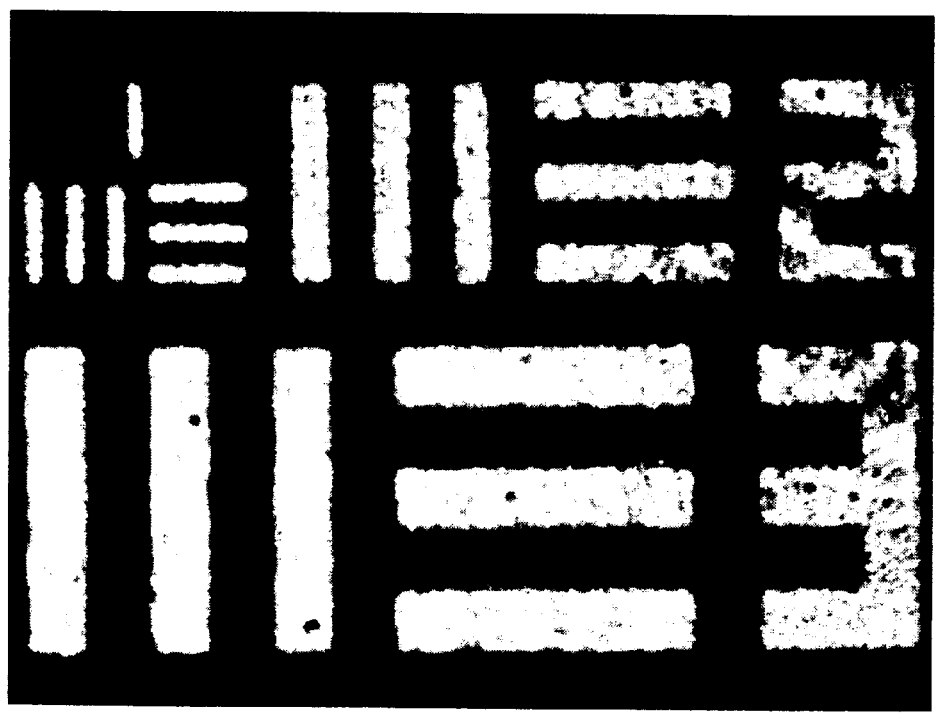
FIG. 9 is an image which is magnified by about five times and picked up by a CCD camera to show the pattern transmitted and obtained by the spatial light modulating device, according to the first example, when the pattern shown in FIG. 8 was displayed on the transmission type liquid crystal element 4.

Next, the spatial light modulating device 100 of the present example including this transmission type liquid crystal element 4 was connected as shown in FIG. 5(b) to the imaging lens 13 and the analyzer 14. Experiments were performed on how the pixel structure component and the signal component of the image displayed on this transmission type liquid crystal element 4 were transmitted to the output plane (image plane) 15. In concrete terms, the image shown in FIG. 8 was displayed on the transmission type liquid crystal element 4 as a signal image to be transmitted, thereby generating the write light for transmitting this signal image. The write light was irradiated on the optically-addressed type parallel-aligned nematic-liquid crystal spatial light modulator 6. The intensity of the write light source 1 and the drive voltage of the spatial light modulator 6 were adjusted to attain a π-phase modulation of the read light for the white portion in the image. The read light source 10 was disposed so that the polarization direction of the read light is tilted 45 degrees with respect to the alignment direction of the liquid crystal molecules of the liquid crystal layer 62. The analyzer 14 was placed in a cross nicol orientation so as to obtain an intensity-modulated output of the read light. The intensity-modulated light was observed as an image on the output plane 15. As a result, as shown in FIG. 9, an image with hardly any degradation in the signal component and moreover with the pixel structure almost completely erased was obtained on the output plane 15. It should be noted that this figure is an image diagram picked up by a CCD camera which is disposed on the image plane 15, wherein the output pattern from the optically-addressed type parallel-aligned nematic-liquid-crystal spatial light modulator 6 is magnified by the imaging lens 13 by about five times. It can be understood that the OTF characteristics of the lens 5 enabled output of an image with the pixel structure completely erased and hardly any degradation in the signal component. It can be confirmed that vertical and horizontal stripes, which are formed from every other pixel rows and every other pixel columns and which have the maximum spatial frequency of the signal component, are clearly outputted.

Another experiment was performed about how diffraction by the pixel structure component and the signal component of the image displayed on the electrically-addressed type element 4 is generated on the Fourier transform plane 12.

Figure 10:
FIG. 10 is a drawing of a picked up image of a finger print image displayed on the transmission type liquid crystal element 4 during another experiment performed according to the first example of the first embodiment.
Figure 11:
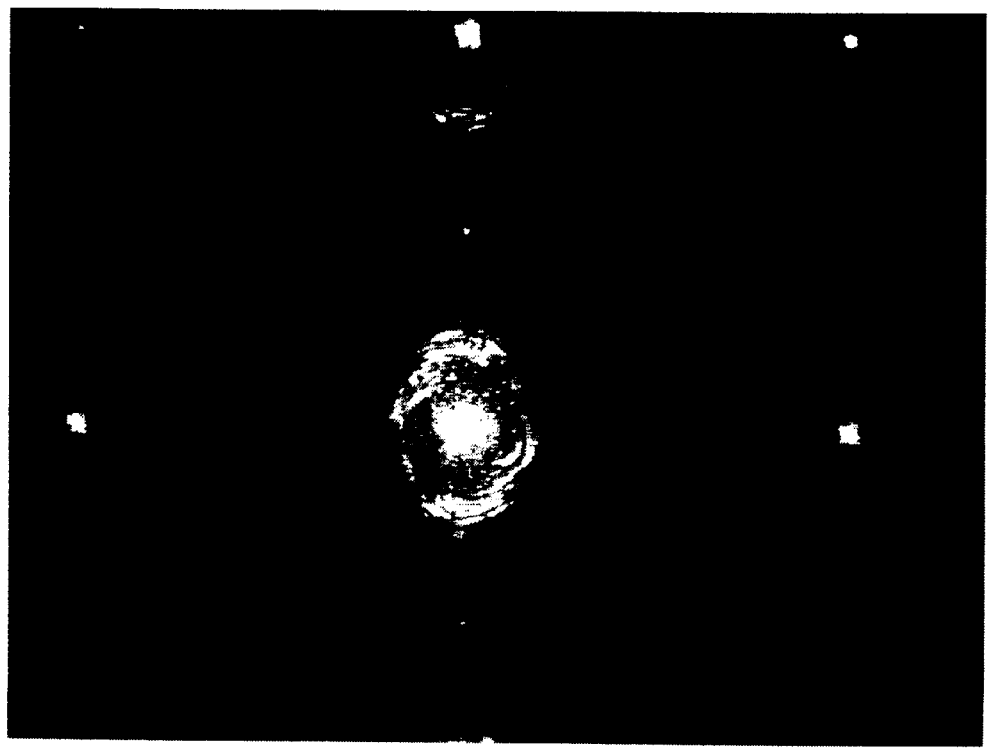
FIG. 11 is a drawing of a picked up image of a diffraction pattern obtained when a Fourier transform lens was used to directly perform Fourier transform on the finger print displayed on the transmission type liquid crystal element 4.

Explained in more detail, a finger print image such as that shown in FIG. 10 was displayed on the transmission type liquid crystal element 4. First, in a comparative experiment, a displayed image of the transmission type liquid crystal element 4 was directly Fourier transformed using a Fourier transform lens. FIG. 11 shows an output image obtained in this case. It can be understood that diffraction patterns from the pixel structure are observed in the portions around the diffraction pattern (Fourier transform image) of the finger print image and those signals result in noise and loss of the signal component.

Figure 12:
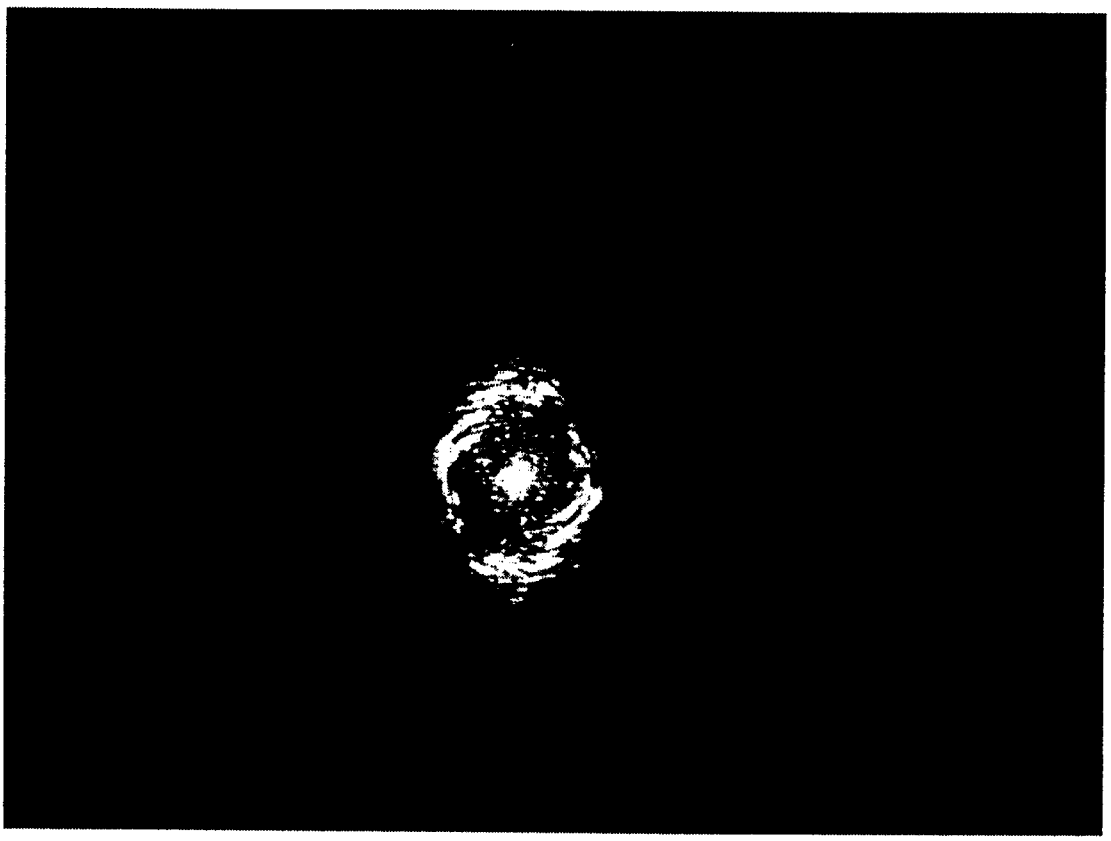
FIG. 12 is a picked up image of a diffraction pattern obtained when the finger print image shown in FIG. 10 is displayed on the transmission type liquid crystal element 4, is transmitted by the spatial light modulating device of the first example of the first embodiment, and is Fourier transformed.

Next, the spatial light modulating device 100 of the present example, including this transmission type liquid crystal element 4, was connected to a Fourier transform lens 11 as shown in FIG. 5(a). That is, the transmission type liquid crystal element 4 was optically connected to the optically-addressed type parallel-aligned nematic-liquid-crystal spatial light modulator 6 through the relay lens 5. The finger print image shown in FIG. 10 was displayed on the transmission type liquid crystal element 4 as a signal image to be transmitted, thereby generating write light for transmitting the signal image. The write light was irradiated on the optically-addressed type parallel-aligned nematic-liquid-crystal spatial light modulator 6. The drive voltage of the spatial light modulator 6 and the intensity of the write light source 1 were adjusted to performs-phase modulation onto the read light with respect to the white portions in the image. At this time, the polarization direction of the read light was brought into parallel with the alignment direction of the liquid crystal molecules in the liquid crystal layer 62, to perform phase-only modulation of the read light. This phase modulated light was Fourier transformed by the Fourier transform lens 11, and observed as a diffraction image on the Fourier plane 12. FIG. 12 shows an output image obtained when output from the spatial light modulating device 100 was Fourier transformed in the above-described manner. It can be understood that no diffraction pattern was generated by the pixel structure of the transmission type liquid crystal element 4.

Figure 13:
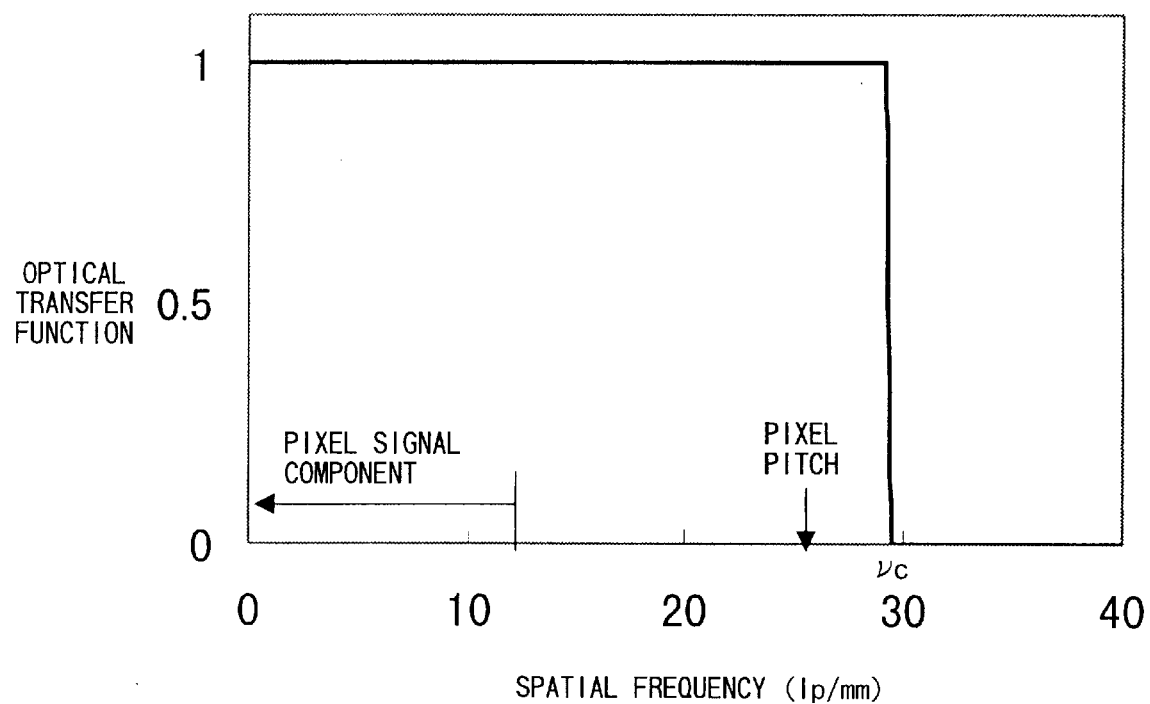
FIG. 13 is a graph showing an optical transfer function curve of a lens according to a comparative example for the first example of the first embodiment.

Further, the diffraction efficiency of the spatial light modulating device 100 of the present example was measured in the optical system of FIG. 5(a). For comparison, the same measurements were performed for the case when a lens with a numerical aperture $NA_L = 0.02$, which satisfies $NA_L/\lambda > 1/P$, and at an imaging magnification rate of 1.0 was used as the relay lens 5. It should be noted that the optical transfer function of the lens in the comparative example is shown in FIG. 13. In this case, the critical spatial frequency $v_c = NA_L/\lambda = 29$ [lp/mm]. Therefore, the signal image that has the spatial frequency of equal to or less than 12.5 [lp/mm] and the signal component caused by the pixel structure, which has a spatial frequency of 25 [lp/mm], are both completely transmitted without any degradation as can be understood by the graph.

During these measurements, a square wave lattice pattern was displayed on the transmission type liquid crystal element 4 as a signal image to be transmitted, thereby generating write light for transmitting the signal image. The write light was irradiated on the optically-addressed type parallel-aligned nematic-liquid-crystal spatial light modulator 6. The polarization direction of the read light was brought into parallel with the alignment direction of the liquid crystal molecules in the liquid crystal layer 62, and phase-only modulation was performed onto the read light. The thus phase-modulated light was Fourier transformed by the Fourier transform lens 11, observed as a diffraction image on the Fourier plane 12, and its diffraction efficiency was measured. The obtained diffraction image had a diffraction component that was caused by the pixel structure when the lens in the comparative example with a numerical aperture $NA_L = 0.02$ was used. In contrast to this, no such diffraction component was observed in the case when the lens of the present example having the numerical aperture $NA_L = 0.013$ was used.

Figure 14:
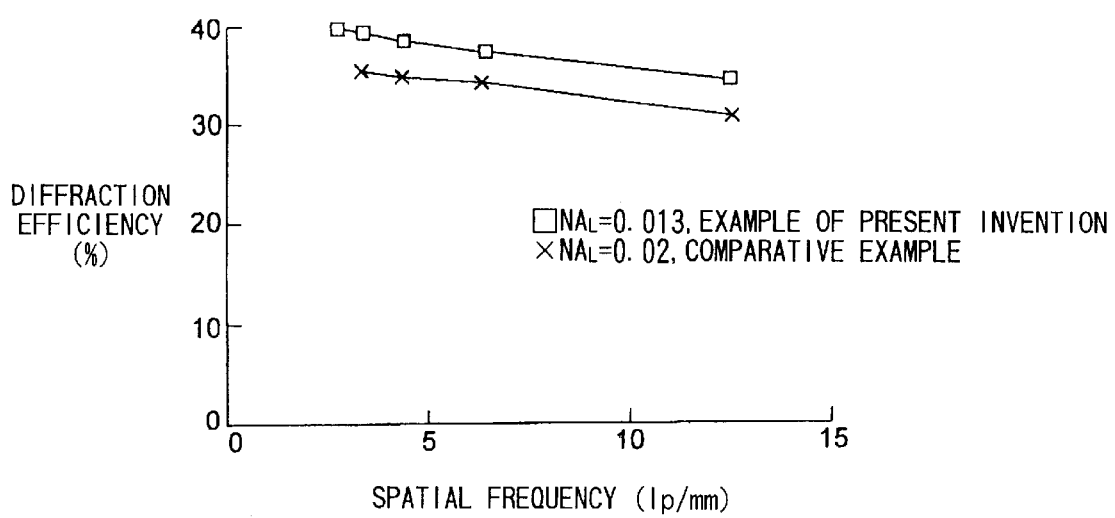
FIG. 14 is a graph showing the diffraction efficiency of the spatial light modulating device in the first example of the first embodiment in comparison with that of the comparative example.

FIG. 14 shows results of diffraction efficiency of first-order diffraction light measured for several spatial frequencies. The graph shows both of the two situations wherein the comparative example lens was used and wherein the lens according to the present example was used. The diffraction efficiency is defined for the obtained diffraction image as (first-order diffraction light intensity/total light amount)× 100%. In the results of measurement for the device according to the present example, which used the lens 5 with the numerical aperture of $NA_L = 0.013$, high diffraction efficiency of near to the theoretical limit of 40.5% was obtained for all the measurement points, which include a measurement point of 12.5 [lp/mm] which is the maximum spatial frequency. On the other hand, the results of measurement of the comparative example device, which used a lens having a numerical aperture $NA_L = 0.02$, show that due to the generated diffraction components caused by the pixel structure, the comparative example device had a diffraction efficiency lower than that for the device according to the present invention.

It can be understood from the above-described results, that by using the spatial light modulating device 100 of the present example, which is configured using the relay lens 5 having the numerical aperture $NA_L$ that satisfies the condition $1/2P < NA_L/\lambda < 1/P$, the signal component caused by the pixel structure can be erased, and moreover, no degradation is generated in the range of all the spatial frequencies of the signal image that can be generated in the transmission type liquid crystal element 4.

In this way, according to the present example, when the relay lens 5 is used to transmit write light between the electrically-addressed type element 4 and the optically-addressed type spatial light modulator 6, the signal component caused by the pixel structure 415 of the electrically-addressed type element 4 can be erased by applying the condition of $NA_L/\lambda < 1/P$ to the numerical aperture $NA_L$ of the relay lens 5. By further applying the condition of $NA_L/\lambda > 1/2P$, the signal image can be transmitted without any degradation in the entire component range of the spatial frequencies included in the signal image that can be generated by the electrically-addressed type element 4 having the pitch P.

SECOND EXAMPLE

A second example will be explained for a situation wherein the relay lens 5 having a numerical aperture of $NA_L = 0.007$ is used. The other conditions are the same as those in the first example.

Figure 15:
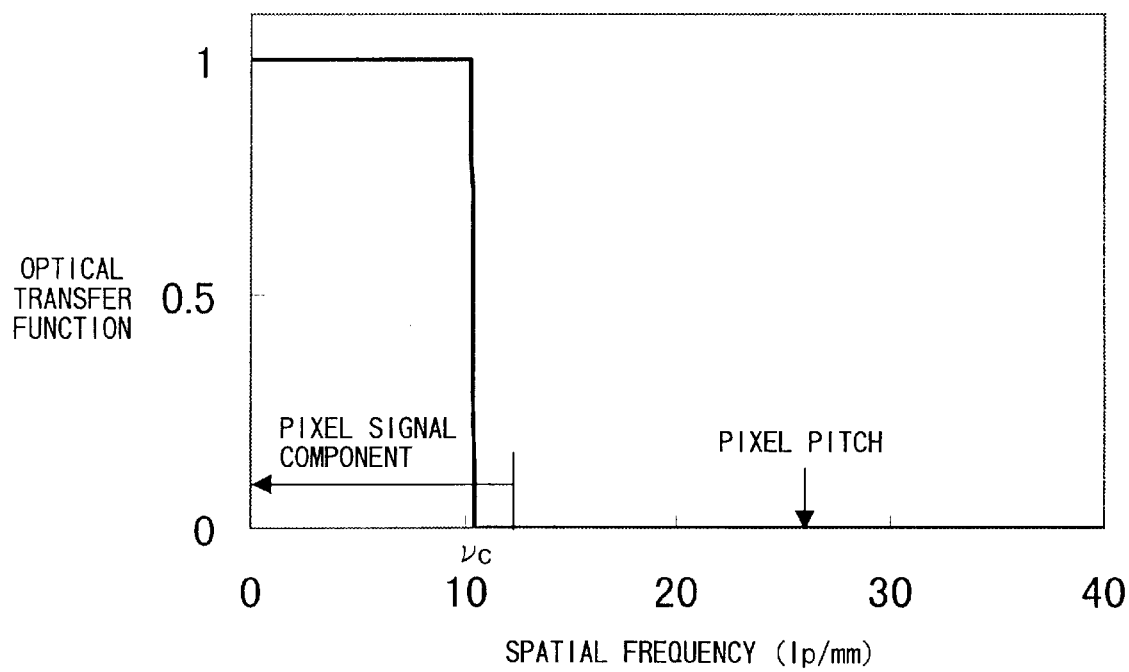
FIG. 15 is a graph showing an optical transfer function curve of a lens according to a second example of the first embodiment.

As shown in FIG. 15, in this case, the critical spatial frequency $v_c = NA_L/\lambda = 10.3$ [lp/mm]. The critical spatial frequency $v_c$ is smaller than the spatial frequency 25 [lp/mm] of the pixel structure 415 ($v_c < 1/P$). Accordingly, the signal component caused by the pixel structure can be completely erased. On the other hand, the critical spatial frequency $v_c$ is smaller than the maximum spatial frequency of 12.5 [lp/mm] of a signal image ($v_c < 1/2P$). Therefore, a portion of the signal image will be damaged. However, a signal image component with a spatial frequency of 10.3 [lp/mm] or less can be completely transmitted without degradation. In this way, by using the relay lens 5 with numerical aperture $NA_L$ that fills the condition of $NA_L/\lambda < 1/P$, at least the signal portion caused by the pixel structure 415 can be completely erased.

THIRD EXAMPLE

A third example will be explained for the situation wherein a red LED having a central light emission wavelength of 660 nm and a half width of 30 nm ($\lambda = 660 \pm 30$ nm)

is used as the write light source 1. The other conditions are the same as those for the first example.

Figure 16:
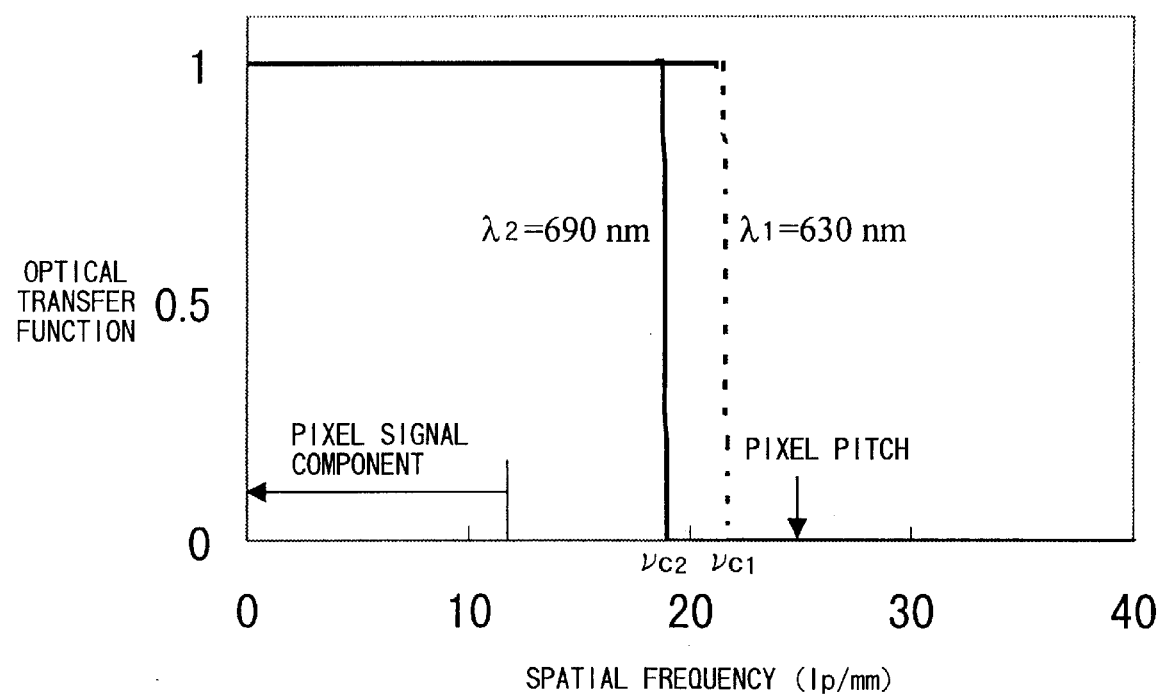
FIG. 16 is a graph showing an optical transfer function curve of a lens according to a third example of the first embodiment.

In this case also, light from the red LED is collimated by the collimator lens 2. Because the red LED can be considered as a substantial point light source, the numerical aperture $\sigma_1$ of the incident optical system is substantially zero. Accordingly, the value $\sigma$ is substantially zero in the same manner as in the first example shown in FIG. 6. When this light source 1 and a relay lens 5 with the numerical aperture $NA_L$ of 0.013 are used, the critical spatial frequency $\upsilon_c$ is as shown in FIG. 16, and is 20.6 [lp/mm] for light having the shortest wavelength $\lambda$ of 630 nm, and is 18.8 [lp/mm] for light with the longest wavelength $\lambda$ of 690 nm. Therefore, all wavelength of the light from this light source 1 fulfills the condition of $1/2P<NA_L/\lambda<1/P$.

Explained in more detail, in this present example, the wavelength $\lambda$ of the write light from the write light source 1 has a wavelength width in the wavelength range of $\lambda_1<\lambda<\lambda_2$. The critical spatial frequency $\upsilon_{c1}$ for light having the shortest wavelength $\lambda_1$ of 630 nm is $\upsilon_{c1}=NA_L/\lambda_1=20.6$ [lp/mm] and the critical spatial frequency $\upsilon_2$ for light having the longest wavelength $\lambda_2$ of 690 nm is $\lambda_{c2}=NA_L/\lambda_2=18.8$ [lp/mm]. Accordingly, the spatial frequency 1/2P=12.5 [p/mm] of the signal image fills the condition of $1/2P<NA_L/\lambda_2$. The spatial frequency 1/P=25 [lp/mm] of the pixel structure 415 fills the condition $NA_L/\lambda_1<1/P$. Accordingly, the light with wavelength $\lambda$ in the entire wavelength range of $\lambda_1<\lambda<\lambda_2$ meets the condition of $1/2P<NA_L/\lambda<1/P$. Accordingly, the signal component caused by the pixel structure is erased also in the present example. Moreover, degradation is not generated in the range of all the spatial frequencies for the signal images that can be generated by the transmission type liquid crystal element 4.

FOURTH EXAMPLE

A fourth example will be explained for the case when a xenon lamp, which is a white light source, is used as the write light source 1. A gap length of the xenon lamp used in this case is 1 mm. A collimator lens 2 with a focal length of 100 mm was used. In this case, the numerical aperture $\sigma_1$ of the incident optical system is 0.005. When the numerical aperture of the relay lens 5 is $NA_L$=0.013, the value of $\sigma$ approaches near the value of 1 as shown in FIG. 6. At this time, in the optical transfer function curve shown in FIG. 6 for $\sigma$=1, the optical transfer function does not reach zero even in the region where the spatial frequency is very close to 1/P=25 [lp/mm], which is the spatial frequency of the signal component caused by the pixel structure 415. However, the value of the optical transfer function for such a spatial frequency region is small. The signal component caused by the pixel structure is therefore distorted when transmitted. Accordingly, the influence of the pixel structure 415 can be reduced.

Figure 17:
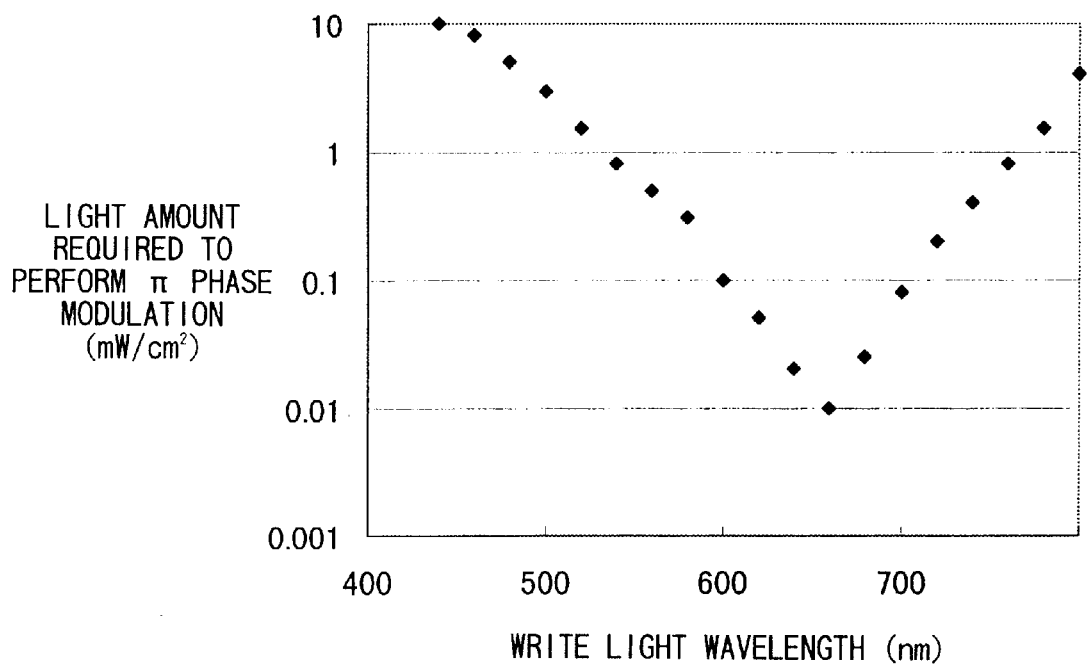
FIG. 17 is a graph showing the sensitivity characteristic, relative to the write light wavelength, of the optically-addressed type parallel-aligned nematic-liquid-crystal spatial light modulator.

The optically-addressed type parallel-aligned nematic-liquid-crystal spatial light modulator 6 has a high sensitivity to write light with a wavelength of 600 to 700 nm. Therefore, write light with a wavelength $\lambda$ in this region should be mainly considered. In more detail, according to the optically-addressed type parallel-aligned nematic-liquid-crystal spatial light modulator 6, the change in the resistivity of the photoconductive layer 61 differs according to the wavelength of the irradiated light. Therefore, the sensitivity can greatly differ depending on the wavelength of the write light. FIG. 17 shows sensitivity of the optically-addressed type parallel-aligned nematic-liquid-crystal spatial light modulator 6 with respect to wavelength of write light. Here, sensitivity of the optically-addressed type spatial light modulator 6, to wavelength of write light, indicates how the amount of light, which is required to be written to induce a predetermined amount of modulation ($\pi$ phase modulation in this case) when a fixed drive voltage is applied, changes according to wavelength of write light. FIG. 17 is a plot of the amount of write light required to induce $\pi$phase modulation, along the vertical axis, with respect to the wavelength of write light indicated in the horizontal axis. For example, when the write light has the wavelength of 660 nm, then a $\pi$phase modulation is achieved by writing with light amount of 0.01 mW/cm². In contrast, when the write light has a wavelength of 600 nm, in order to attain a $\pi$ phase modulation, it is necessary to input write light with the amount of 0.1 mW/cm². It is clear from FIG. 17 that sensitivity of the optically-addressed type parallel-aligned nematic-liquid-crystal spatial light modulator 6 is highest near the wavelength of 660 nm. Sensitivity is lower on either side of 660 nm wavelength. Sensitivity is about $\frac{1}{10}$ at 600 nm and 700 nm, respectively.

When a light source having a certain amount of wavelength width, such as white light, is used as the write light source 1 as in the present example, it is desirable to determine the numerical aperture $NA_L$ of the relay lens 5 with respect to the wavelength $\lambda$ with the highest sensitivity in the sensitivity characteristic, to the write light, of the spatial light modulator 6. In the case of the optically-addressed type parallel-aligned nematic-liquid-crystal spatial light modulator 6, sensitivity is best with respect to light wavelength of 660 nm. Therefore, it is desirable to use the relay lens 5 that meets the condition of $1/2P<\lambda_c$ $(=NA_L/\lambda)$ $<1/P$ for $\lambda$=660 nm. In the present example, therefore, a relay lens 5 with $NA_L$=0.013 was used.

Figure 18:
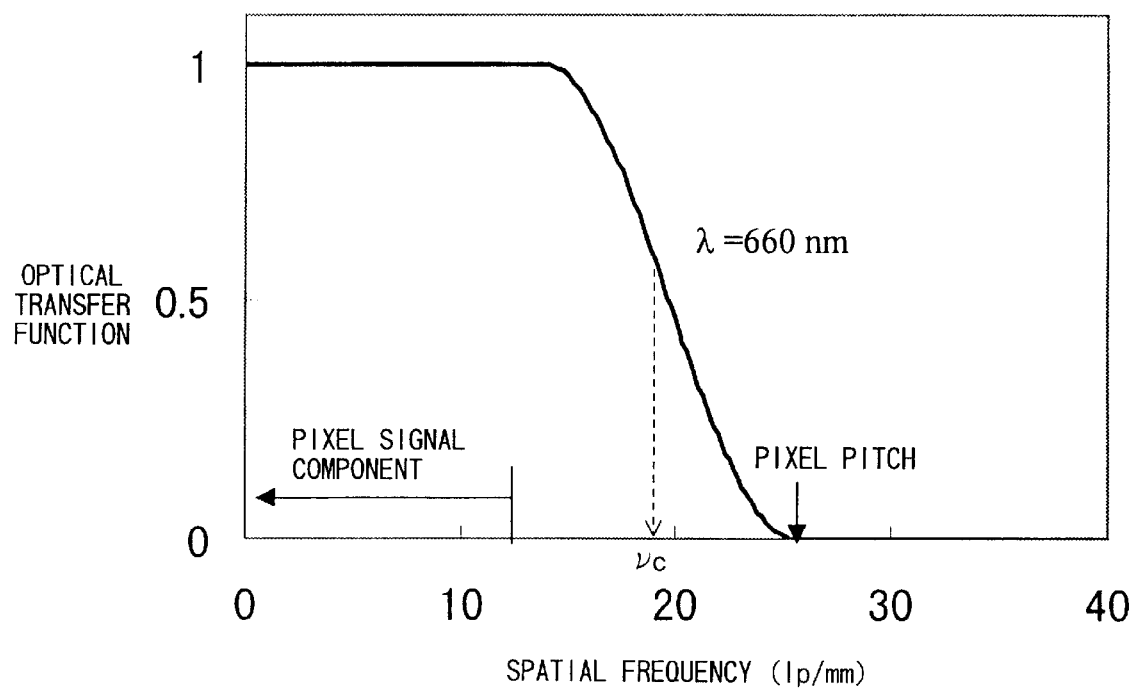
FIG. 18 is a graph showing the optical transfer function curve of a lens according to a fourth example of the first embodiment.
Figure 19:
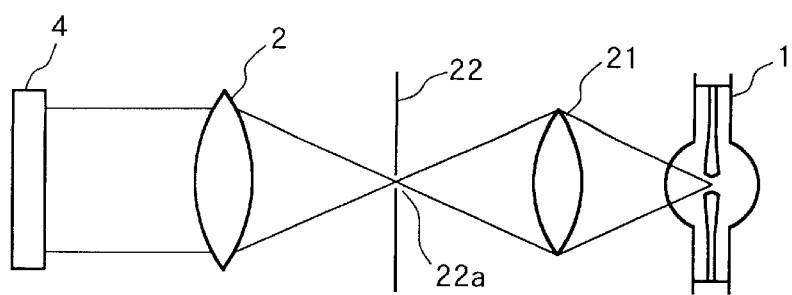
FIG. 19 is a configurational diagram showing a modification of the incident optical system of when a xenon lamp is used as the white light source.

FIG. 18 shows optical transfer function of the relay lens 5 with $NA_L$ of 0.013 with respect to light having a wavelength of 660 nm in the write light optical system that uses the xenon lamp 1 as described above. Completely parallel light cannot be realized because of the ark length of 1 mm. Accordingly, the shape of the optical transfer function differs from when using an LD or LED, and so has a form with a slight slant in the shift of OTF from 1.0 to 0. A light source that is nearly a point light source can, however, be obtained by using a lens with a large focal length for the collimator lens 2, or as shown in FIG. 19, by providing a converging lens 21 and a pin-hole plate 22 between the xenon lamp 1 and the collimator lens 2. In the case of FIG. 19, light from the xenon lamp 1 is focused by the converging lens 21. A pin hole 22a with a small diameter is located at a position where the light is converged at the maximum illumination on the image plane so that the ark length of the xenon lamp can be considered as being shorter than the actual length. By using the above-described method, it is possible to modify the form of the optical transfer function so that the OTF will rapidly change from 1.0 to 0. The pixel structure component can be erased with extreme efficiency.

In the case of the present example, the condition of $1/2P<NA_L/\lambda<1/P$ is not met by all the wavelength of the white write light source 1. However, by filling the condition of $1/2P<NA_L/\lambda<1/P$ in the wavelength region that mainly contributes to the modulation in the optically-addressed type parallel-aligned nematic-liquid-crystal spatial light modulator 6, the influence of the pixel structure on the output plane will become extremely small and an efficient spatial light modulating device can be realized.

Next, a spatial light modulating device according to a second embodiment of the present invention will be described while referring to FIGS. 20 to 23(b).

Figure 20:
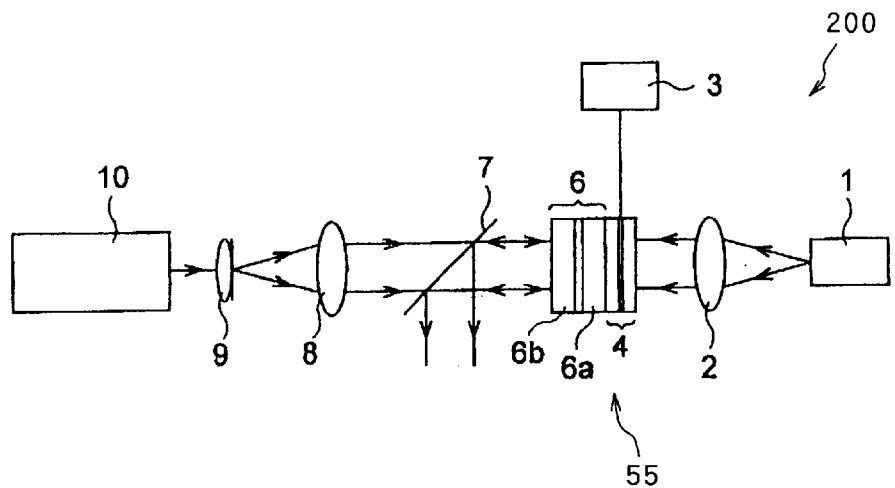
FIG. 20 is a configurational diagram showing a spatial light modulating device according to a second embodiment of the present invention.

FIG. 20 is a configurational diagram of a spatial light modulating device 200 according to the second embodiment of the present invention. It should be noted that components with the same or substantially the same configuration as those of the spatial light modulating device 100 of the first embodiment are given with the same numbering, and their explanation is omitted.

Next will be described, while referring to FIG. 20, differences between the spatial light modulating device 200 according to the second embodiment and the spatial light modulating device 100 according to the first embodiment.

In the present embodiment, the spatial light modulating device 200 includes an integrated-type electrically-addressed spatial light modulating device 55. That is, the transmission type liquid crystal element 4 and the optically-addressed type parallel-aligned nematic-liquid-crystal spatial light modulator 6 are connected directly with each other, without use of the relay lens 5, to form the integral type electrically-addressed spatial light modulating device 55. It should be noted that in the same manner as the spatial light modulating device 100 of the first embodiment, the spatial light modulating device 200 can be used to measure diffraction phenomenon and the like by being connected with the Fourier transform lens 11 as shown in FIG. 23(a), and can be used for image display by being connected to the imaging lens 13 and the analyzer 14 as shown in FIG. 23(b).

Figure 21:
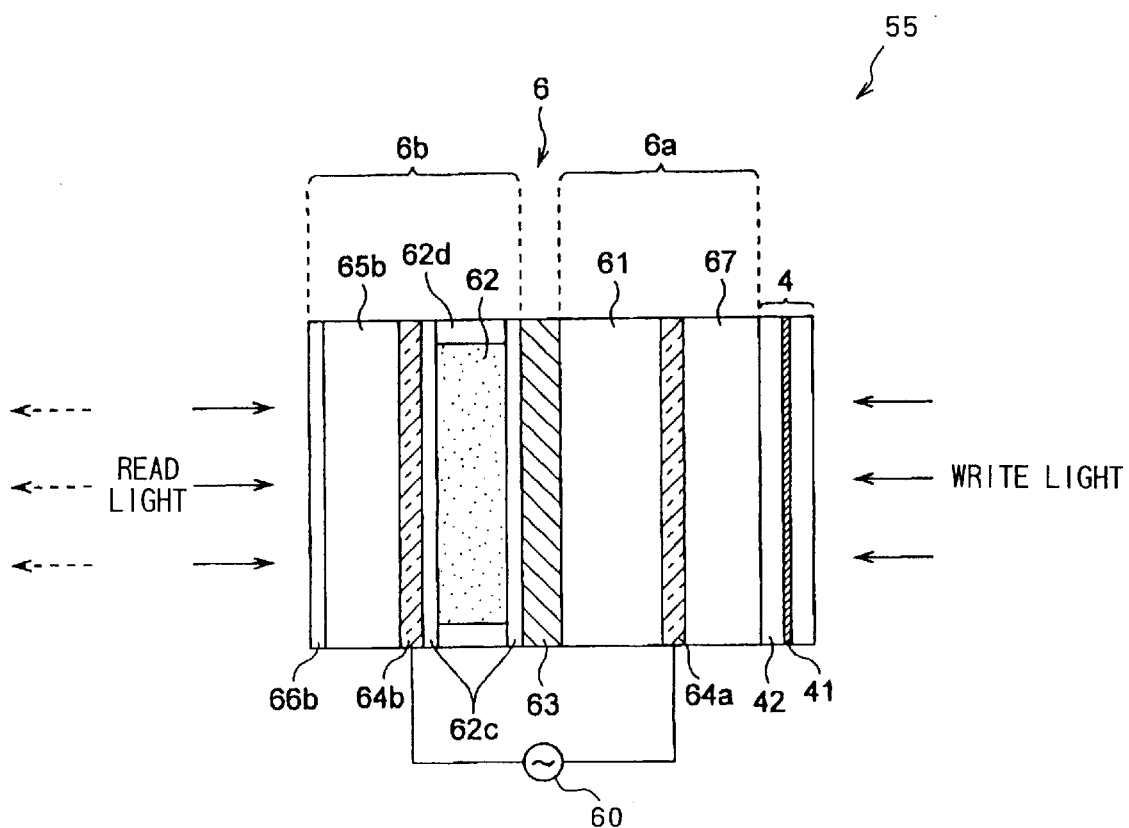
FIG. 21 is a magnified configurational diagram of an electrically-addressed type spatial light modulating device, which is configured with the transmission type liquid A crystal element and the optically-addressed type parallel-aligned nematic-liquid-crystal spatial light modulator in integral configuration, in the spatial light modulating device according to the second embodiment.

FIG. 21 shows a magnified configurational diagram of the optically-addressed type parallel-aligned nematic-liquid-crystal spatial light modulator 6 and the transmission type liquid crystal element 4 which are used in the integral type electrically-addressed spatial light modulating device 55, shown in FIG. 20, and shows the connection method how they are connected.

The liquid crystal element 4 has the same configuration as that shown in FIG. 2. That is, the light transmission layer 42, which is the output end, is configured from the transparent glass substrate 401 and the polarizing plate 412. Here, the transparent glass substrate 401 and the polarizing plate 412 have substantially the same, uniform refractive index. Accordingly, the light transmission layer 42 has substantially a uniform refractive index.

Figure 22:
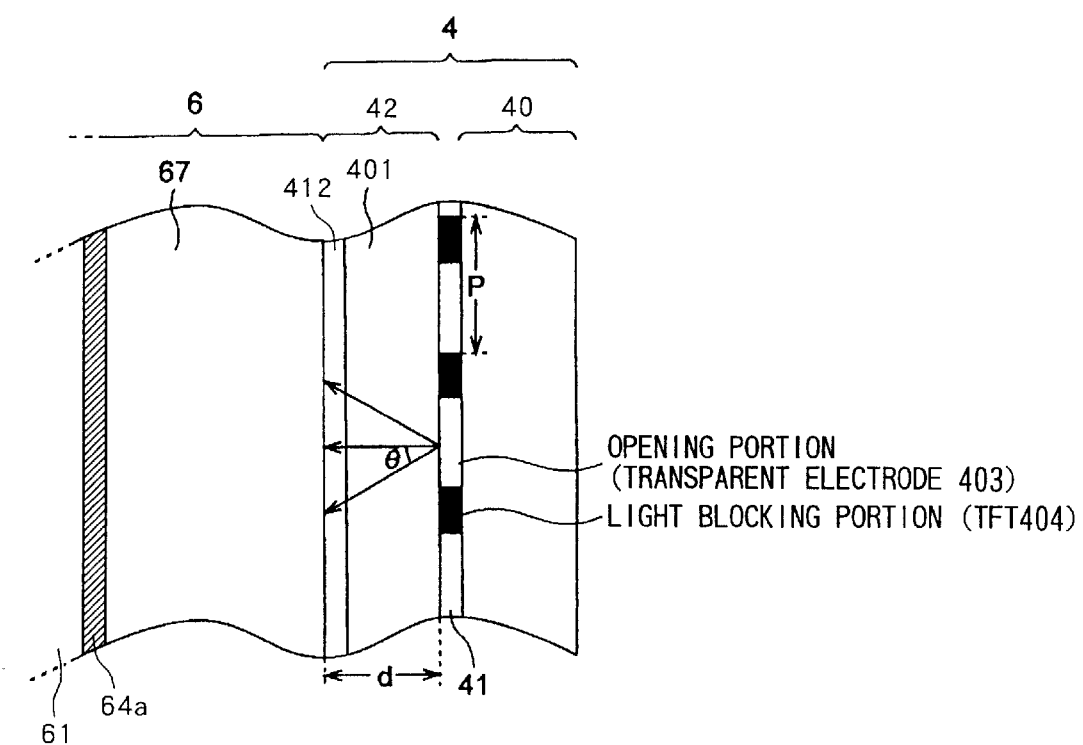
FIG. 22 is a magnified view explaining a critical spatial frequency of the spatial light modulating device according to an example of the second embodiment.
Figure 23:
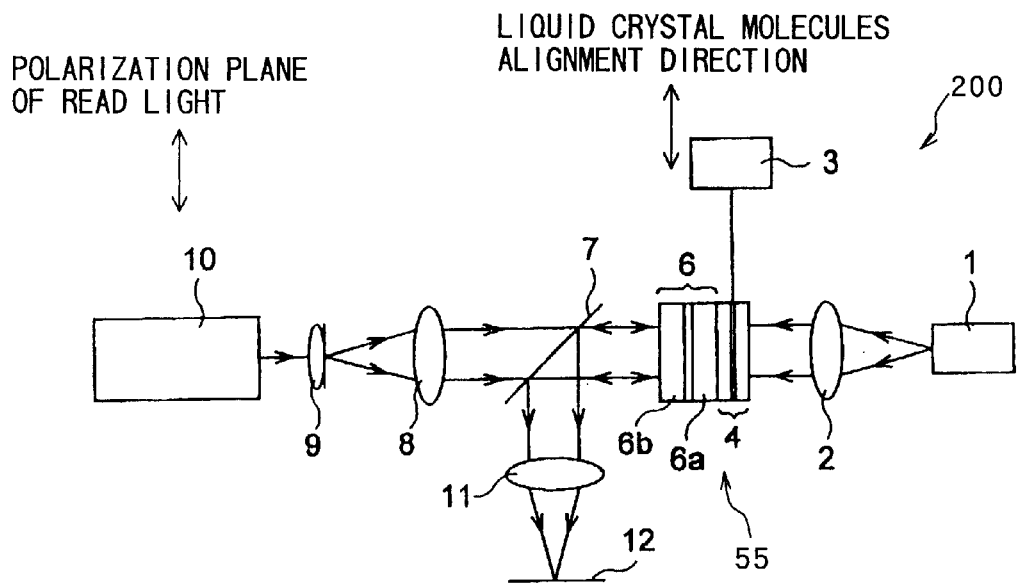
FIG. 23($a$) is a configurational diagram showing a form of use of the spatial light modulating device according to the second embodiment of the present invention.
Figure 23:
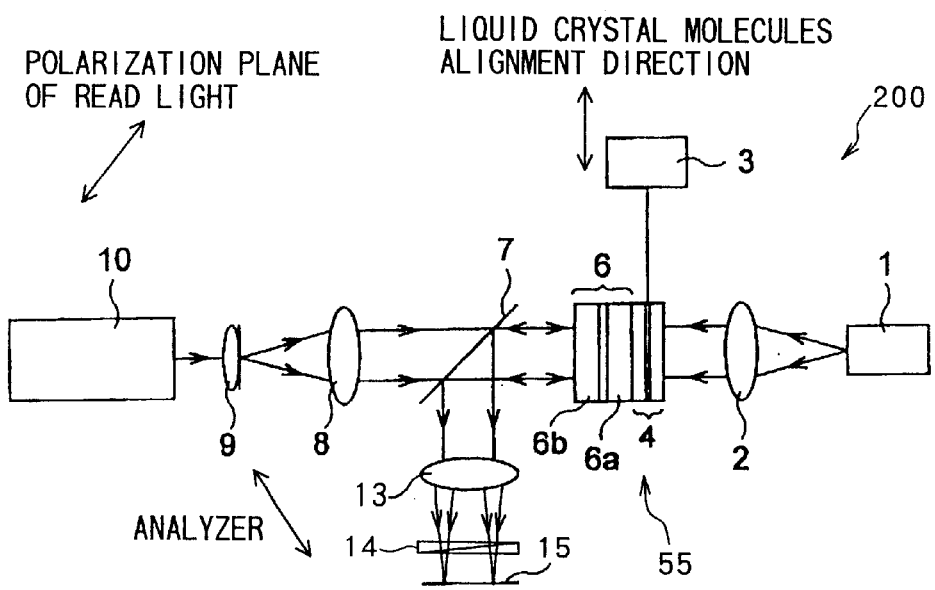

The optically-addressed type parallel-aligned nematic-liquid-crystal spatial light modulator 6 has substantially the same configuration as shown in FIG. 3. However, as the write light input end of the write portion 6a, a fiber optic plate 67 is used instead of the transparent glass substrate 65a with the anti-reflection coating 66a. As shown in FIG. 22, the light transmission layer 42 (more particularly the polarizing plate 412) of the transmission type liquid crystal element 4 and the fiber optic plate 67 of the optically-addressed type parallel-aligned nematic-liquid-crystal spatial light modulator 6 are directly connected with each other. An optical connection element, for transmitting write light from the light modulation layer 41 of the transmission type liquid crystal element 4 to the photoconductive layer 61 of the optically-addressed, type parallel-aligned nematic-liquid-crystal spatial light modulator 6, is configured from the optically-connected light transmission layer 42 and fiber optic plate 67.

It should be noted that the transparent glass substrate 401 can be connected to the fiber optic plate 67 by reversing the positions of the transparent glass substrate 401 and the polarizing plate 412 so that the transparent glass substrate 401 is an outermost layer of the transmission type liquid crystal element 4. Also, a transparent, liquid- or grease-state material, or the like, can be sealed between the transparent glass substrate 401 and the fiber optic plate 67 if necessary.

The spatial light modulating device 200 according to the present embodiment, which includes the integral type electrically-addressed spatial light modulating device 55 having the above-described configuration, operates in a manner described below.

The electric signal generation circuit 3 drives to electrically address the transmission type liquid crystal element 4 using an electric video signal relating to information to be written. When the write light with wavelength λ falls incident on the transmission type liquid crystal element 4, the write light is modulated by the transmission type liquid crystal element 4 and propagates through the light transmission layer 42 and the fiber optic plate 61 to fall incident on the photoconductive layer 61 of the optically-addressed type spatial light modulator 6 as a signal image. The read light from the read light source 10 falls incident on the liquid crystal layer 62, and is modulated according to the signal image. The read light is then outputted and reflected off the half mirror 7 to be outputted.

As shown in FIG. 23(a), in order to Fourier transform the output light from the spatial light modulating device 200 and measure a Fourier image, the polarization direction of the read light from the read light source 10 is aligned parallel with the liquid crystal alignment direction (the liquid crystal alignment direction in the off condition shown in FIG. 4(a)) of the liquid crystal layer 61, thereby making the liquid crystal layer 61 perform phase-only modulation. As shown in FIG. 23(b), in order to image the output light from the spatial light modulating device 200 and display the image, the polarization direction of the read light is shifted at a 45 degree angle to the liquid crystal alignment direction in the liquid crystal layer 61, thereby performing intensity modulation by using the analyzer 14 which is disposed in the cross nicol orientation.

In the case of the present embodiment, the fiber optic plate 67 has a refractive index distribution at a predetermined pitch $F_p$. The pitch $F_p$ is sufficiently small compared to the pitch P of the transmission type liquid crystal element 4. Accordingly, the critical spatial frequency, capable of being transmitted by the fiber optic plate 67, is determined by the pitch $F_p$ as $1/2F_p$. Said differently, the fiber optic plate 67 has a refractive index distribution that is capable of transmitting the inputted image while maintaining its resolution (spatial frequency sufficiently less than the critical spatial frequency $1/2F_p$). For example, when the pitch $F_p$ is 3 μm, the critical spatial frequency that can be transmitted is determined to be about 167 [lp/mm]. However, actually the write light signal image broadens in the light transmission layer 42 before falling incident on the fiber optic plate 67. Therefore, the critical spatial frequency $v_c$ in the present embodiment is a value lower than the critical spatial frequency $1/2F_p$ of the fiber optic plate 67.

Next, a more detailed explanation will be provided for the critical spatial frequency $v_c$ according to the present embodiment while referring to the magnified diagram of the connection portion in FIG. 22.

The critical spatial frequency $v_c$ is determined by the pitch P of the pixel structure 415 of the transmission type liquid crystal element 4, the thickness d of the light transmission layer 42, the refractive index $n_G$ of the light transmission layer 42 with respect to the wavelength λ of the write light from the write light source 1, the numerical aperture $σ_1$ of the incident optical system, and the numerical aperture $NA_{FOP}$ of the fiber optic plate 67. The pitch P is shown in FIG. 2. The thickness d of the light transmission layer 42 is the sum of the thickness of the transparent glass substrate 401 and the polarizing plate 412. The refractive index $n_G$ is the refractive index of the transparent glass substrate 401 and the polarizing plate 412 with respect to the wavelength λ of the write light. Because scattered light is used as the incident light in the present embodiment, the numerical aperture $\sigma_1$ of the incident optic system is large compared to the numerical aperture $NA_{FOP}$ of the fiber optic plate 67. It is noted that write light is outputted from a transparent pixel electrode 403 (opening portion) of the image display portion (light modulation layer) 41 in the transmission type liquid crystal element 4. It is assumed that among the thus outputted light, light that can fall incident on the fiber optic plate 67, after passing through the light transmission layer 42 (transparent glass substrate 401 and the polarizing plate 412), and that can be transmitted, has a maximum angle θ. In this case, the critical spatial frequency $\upsilon_c$ is defined as $\upsilon_c=1/(\tan\theta \cdot d)$. Accordingly, the critical spatial frequency $\upsilon_c$ is determined to be about $n_G/(d \cdot NA_{FOP})$.

In order to erase the signal component caused by the pixel structure 415, therefore, it is necessary to fulfill the condition $\upsilon_c (=n_G/(d \cdot NA_{FOP}))<1/P$. In this case, the numerical aperture $NA_{FOP}$ of the fiber optic plate 67 has to fulfill the condition of $NA_{FOP}>n_G \cdot P/d$. Similarly, in order to prevent the signal image from degrading to the maximum spatial frequency, it is necessary to fulfill the requirement of $\lambda_c (=n_G/(d \cdot NA_{FOP}))>1/2P$. Accordingly, the numerical aperture $NA_{FOP}$ of the fiber optic plate 67 needs to fulfill the condition $NA_{FOP}<2\ n_G \cdot P/d$.

Next, the present embodiment will be explained in still further detail using an example. However, the present embodiment is not limited to the example.

EXAMPLE

The transmission type liquid crystal element 4 with the pitch P=40 μm as in the first example of the first embodiment was used. The thickness of the light transmission layer 42 (the sum of the thickness of the transparent glass substrate 401 and the polarizing plate 412) was 1 mm. The fiber optic plate 67 had the pitch $F_P$ of 3 μm and the thickness of 5 mm. A semiconductor laser with wavelength λ of 680 nm was used as the write light source 1. The transparent glass substrate 401 and the polarizing plate 412, which configure the light transmission layer 42, had substantially the same refractive index of $n_G=1.5$ with respect to wavelength λ=680 nm. The fiber optic plate 67 used in the present example had a numerical aperture $NA_{FOP}$ that fulfills the condition $0.06<NA_{FOP}<0.12$. The condition $n_G \cdot P/d<NA_{FOP}<2\ n_G \cdot P/d$ is therefore fulfilled ($n_G \cdot P/d=0.06$, $2\ n_G \cdot P/d=0.12$). Accordingly, also in the present example, the signal component caused by the pixel structure 415 could be erased and no degradation could be generated in the range of all the spatial frequencies of the signal image that can be generated in the transmission type liquid crystal element 4.

In this way, according to the present example, in the situation wherein the light transmission layer 42 at the output end of the electrically-addressed type element 4 and the fiber optic plate 67 at the write light input end of the optically-addressed type spatial light modulator 6 are used to transmit write light, by applying the condition of $NA_{FOP}>n_g \cdot P/d$ to the numerical aperture $NA_{FOP}$ of the fiber optic plate 67, the signal component caused by the pixel structure can be erased, and further by applying the condition $NA_{FOP}<2\ n_g \cdot P/d$, a signal image can be transmitted without generating any degradation in the component range of all spatial frequencies included in the signal image.

It should be noted that if the numerical aperture $NA_{FOP}$ of the fiber optic plate 67 is set to 0.15, for example, in the same manner as in the second example of the first embodiment, the pitch P of the pixel structure 415 of the electrically-addressed type element 4, the thickness d of the light transmission layer 42, and the refractive index $n_G$ of the light transmission layer 42 to the wavelength λ of the write light establish the relationship of $NA_{FOP}>n_G \cdot P/d$.

Therefore, at least the signal component caused by the pixel structure 415 can be erased.

When a light source having a certain wavelength width, such as white write light or the like, is used as the write light source 1, it is desirable to set the numerical aperture $NA_{FOP}$ of the fiber optic plate 67 to fulfill the condition of $n_G \cdot P/d<NA_{FOP}<2\ n_G \cdot P/d$ with respect to the refractive index $n_G$ of the light transmission layer 42 for wavelength λ (=660 nm), at which the write light wavelength sensitivity characteristic of the optically-addressed type parallel-aligned nematic-liquid-crystal spatial light modulator 6 presents the maximum sensitivity. In this way, by filling the condition $n_G \cdot P/d<NA_{FOP}<2\ n_G \cdot P/d$ in the wavelength region that mainly contributes to the modulation in the optically-addressed type parallel-aligned nematic-liquid-crystal spatial light modulator 6, an efficient spatial light modulating device with extremely low influence from the pixel structure at the output plane can be realized.

The spatial light modulating device according to the present invention is not limited to the above-described embodiments and can be modified in a variety of ways.

For example, the transmission type liquid crystal element 4 is not limited to the configuration of FIG. 2. A transmission type liquid crystal element 4 having a pixel structure with the pitch P having a variety of configurations can be used.

In the above-described embodiments, the transmission type liquid crystal element 4 is disposed as shown in FIG. 2 with respect to the collimator lens 2 and the relay lens 5. Therefore, the substrate 409 and the polarizing plate 413 function as the light incident layer 40, and the substrate 401 and the polarizing plate 412 function as a light transmission layer 42. However, the transmission type liquid crystal element 4 can be disposed facing in the opposite direction than that shown in FIG. 2 so that the substrate 401 and the polarizing plate 412 function as the light incident layer 40 and the substrate 409 and the polarizing plate 413 function as the light transmission layer 42. In this case, write light from the collimator lens 2 falls incident on the polarizing plate 412, and is modulated by the liquid crystal layer 411, and afterwards is outputted toward the relay lens 5 through the transparent substrate 409 and the polarizing plate 413. In this case, the positions of the transparent substrate 409 and the polarizing plate 413 can be reversed so that the transparent substrate 409 is an outermost layer of the transmission type liquid crystal element 4. In the case of the second embodiment, the transparent substrate 409 that is thus put on the outermost layer can be connected to the fiber optic plate 69. In this case, a transparent, liquid- or grease-state material, or the like can be sealed between the transparent substrate 409 and the fiber optic plate 67 if necessary.

In the above-described embodiments, an optically-addressed type parallel-aligned nematic-liquid-crystal spatial light modulator was used as the optically-addressed type spatial light modulator 6. However, a variety of other different optically-addressed type spatial light modulators can be used instead. In this case, when a source of light, such as white light having a certain wavelength width, is used as the write light source 1, then it is desirable to determine the numerical aperture $NA_L$ of the relay lens 5 (first embodiment) or the numerical aperture $NA_{FOP}$ of the fiber optic plate 67 (second embodiment) to fill the corresponding condition $1/2P<NA_L/\lambda<1/P$ or $n_G \cdot P/d<NA_{FOP}<2\ n_g \cdot P/d$ for the wavelength where the maximum sensitivity is attained in the write light wavelength sensitivity characteristic of the optically-addressed type spatial light modulator 6. Also, when the write light wavelength sensitivity characteristic of the optically-addressed type spatial light modulator 6 has a higher sensitivity in a predetermined wavelength region having a predetermined wavelength width than in other wavelength regions, the numerical aperture $NA_L$ or $NA_{FOP}$ may be set to fill the condition $1/2P<NA_L/\lambda<1/P$ or $n_G \cdot P/d<NA_{FOP}<2\ n_G \cdot P/d$ for the predetermined wavelength region. By filling these conditions in the wavelength region that mainly contributes to the modulation in the optically-addressed type spatial light modulator 6, an efficient spatial light modulating device having extremely little influence from the pixel structure at the output surface can be realized.

INDUSTRIAL APPLICABILITY

The spatial light modulating device according to the present invention can be broadly used for image projector display devices, and for optical information processors, which use diffraction phenomenon, such as a spatial Fourier transformation. Examples of the optical information processors include diffraction efficiency measurement devices, image recognition devices that perform finger print checking by using optical correlation calculation, and displacement/speed measuring devices.

What is claimed is:

1. A spatial light modulating device, comprising:
    an electrically-addressed type spatial light modulator, which has a pixel structure where a plurality of pixels are arranged at a predetermined pitch P, and which is addressed by electric signals representing information to be written, thereby modulating incident write light;
    an optically-addressed type spatial light modulator, which has an optical addressing layer and a light modulation layer between a pair of transparent electrodes and which modulates read light incident to the light modulation layer by the write light incident to the optical addressing layer; and
    an optical connecting element which guides the write light, which has been modulated by the electrically-addressed type spatial light modulator and which has been outputted therefrom, to the optical addressing layer of the optically-addressed type spatial light modulator,
    the optical connecting element having a predetermined critical transfer spatial frequency $\upsilon_c$, the value of the critical transfer spatial frequency $\upsilon_c$ and the value of a pixel structure spatial frequency $1/P$ of the pixel structure in the electrically-addressed type spatial light modulator satisfying the following relationship: $\upsilon_c<1/P$.

2. A spatial light modulating device as claimed in claim 1, wherein the value of the critical transfer spatial frequency $\upsilon_c$ of the optical connecting element and the value of the pixel structure spatial frequency $1/P$ satisfy the following relationship: $1/2P<\upsilon_c$.

3. A spatial light modulating device as claimed in claim 2, wherein the optically-addressed type spatial light modulator has sensitivity characteristic to write light wavelength, the sensitivity characteristic having a predetermined sensitivity to a predetermined wavelength $\lambda$ and having another sensitivity to a wavelength other than the predetermined wavelength $\lambda$, the predetermined sensitivity being higher than the other sensitivity, the value of the critical transfer spatial frequency $\upsilon_c$ of the optical connecting element being determined based on a numerical aperture NA of the optical connecting element and the predetermined wavelength $\lambda$.

4. A spatial light modulating device as claimed in claim 3, wherein the optical connecting element includes a relay lens that has a numerical aperture $NA_L$ at a side of the electrically-addressed type spatial light modulator, the value of the critical transfer spatial frequency $\upsilon_c$ being equal to $NA_L/\lambda$.

5. A spatial light modulating device as claimed in claim 3, wherein the optical connecting element includes a light transmission layer and a fiber optical plate which are connected with each other, the light transmission layer being connected to the electrically-addressed type spatial light modulator, the fiber optical plate being connected to the optically-addressed type spatial light modulator, the fiber optical plate having a numerical aperture $NA_{FOP}$, the light transmission layer having a thickness d and having a predetermined refractive index $n_G$ to the predetermined wavelength $\lambda$, the value of the critical transfer spatial frequency $\upsilon_c$ being substantially equal to $n_G/(d \cdot NA_{FOP})$.

6. A spatial light modulating device, comprising:
    an electrically-addressed type spatial light modulator, which has a pixel structure where a plurality of pixels are arranged at a predetermined pitch P, and which is addressed by electric signals representing information to be written, thereby modulating incident write light;
    a relay lens for transferring the write light outputted from the electrically-addressed type spatial light modulator; and
    an optically-addressed type spatial light modulator, which has an optical addressing layer and a light modulation layer between a pair of transparent electrodes and which modulates read light by the write light outputted from the electrically-addressed type spatial light modulator,
    the optically-addressed type spatial light modulator having sensitivity characteristic to write light wavelength, the sensitivity characteristic having a predetermined sensitivity to a predetermined wavelength $\lambda$ and having another sensitivity to a wavelength other than the predetermined wavelength $\lambda$, the predetermined sensitivity being higher than the other sensitivity,
    the relay lens having a numerical aperture $NA_L$ at a side of the electrically-addressed type element the value of the numerical aperture $NA_L$, the predetermined pitch P of the pixel structure in the electrically-addressed type spatial light modulator, and the predetermined wavelength $\lambda$ of the optically-addressed type spatial light modulator satisfying the following relationship: $NA_L/\lambda<1/P$.

7. A spatial light modulating device as claimed in claim 6, wherein the value of the numerical aperture $NA_L$, at a side of the electrically-addressed type element of the relay lens, the predetermined pitch P of the pixel structure in the electrically-addressed type element, and the predetermined wavelength $\lambda$ of the optically-addressed type spatial light modulator further satisfy the following relationship: $NA_L/\lambda>1/2P$.

8. A spatial light modulating device as claimed in claim 6, wherein the electrically-addressed type spatial light modulator includes a transmission type liquid crystal element.

9. A spatial light modulating device as claimed in claim 6, wherein the optically-addressed type spatial light modulator includes an optically-addressed type spatial light modulator that uses a photoconductive layer as the optical addressing layer and that uses a liquid crystal layer as the light modulation layer.

10. A spatial light modulating device, comprising:
an electrically-addressed type spatial light modulator, which has a pixel structure where a plurality of pixels are arranged at a predetermined pitch P, and which is addressed by electric signals representing information to be written, thereby modulating incident light; and
an optically-addressed type spatial light modulator, which has an optical addressing layer and a light modulation layer between a pair of transparent electrodes and which modulates read light by the write light outputted from the electrically-addressed type spatial light modulator,
an output end of the electrically-addressed type spatial light modulator, that faces the optically-addressed type spatial light modulator, being constructed from a light transmission layer with a uniform refractive index, a write light input end of the optically-addressed type spatial light modulator, that faces the electrically-addressed type spatial light modulator, being constructed from a fiber optical plate which has a refractive index distribution for transferring an input image while maintaining a resolution of the input image, the light transmission layer and the fiber optical plate being optically connected with each other,
the optically-addressed type spatial light modulator having sensitivity characteristic to write light wavelength, the sensitivity characteristic having a predetermined sensitivity to a predetermined wavelength $\lambda$ and having another sensitivity to a wavelength other than the predetermined wavelength $\lambda$, the predetermined sensitivity being higher than the other sensitivity,
a numerical aperture $NA_{FOP}$ of the fiber optical plate, the predetermined pitch P of the pixel structure in the electrically-addressed type spatial light modulator, a thickness d of the light transmission layer, and a refractive index $n_G$ of the light transmission layer to the predetermined wavelength $\lambda$ satisfying the following relationship: $NA_{FOP} > n_G \cdot P/d$.

11. A spatial light modulating device as claimed in claim 10, wherein the numerical aperture $NA_{FOP}$ of the fiber optical plate, the predetermined pitch P of the pixel structure of the electrically-addressed type spatial light modulator, the thickness d of the light transmission layer, and the refractive index $n_G$ of the light transmission layer to the predetermined wavelength $\lambda$ further satisfy the following relationship: $NA_{FOP} < 2n_G \cdot P/d$.

12. A spatial light modulating device as claimed in claim 10, wherein the electrically-addressed type spatial light modulator includes a transmission type liquid crystal element.

13. A spatial light modulating device as claimed in claim 10, wherein the optically-addressed type spatial light modulator includes an optically-addressed type spatial light modulator that uses a photoconductive layer as the optical addressing layer and that uses a liquid crystal layer as the light modulation layer.

14. A spatial light modulating device comprising:
a write light source for producing a write light;
an electrically-addressed type element, which has a pixel structure where a plurality of pixels are arranged at a predetermined pitch P, which is addressed by electric signals representing information to be written, and which is inputted with the light from the write light source;

a relay lens for transferring the write light which is generated by the electrically-addressed type element and which is outputted therefrom;
an optically-addressed type spatial light modulator, which has an optical addressing layer and a light modulation layer between a pair of transparent electrodes; and
a read light source for producing a read light for the optically-addressed type spatial light modulator,
the relay lens having a numerical aperture $NA_L$ at a side of the electrically-addressed type element the value of the numerical aperture $NA_L$, the predetermined pitch P of the pixel structure of the electrically-addressed type element, and a wavelength $\lambda$ of the light from the write light source satisfying the following relationship: $NA_L/\lambda < 1/P$.

15. A spatial light modulating device as claimed in claim 14, wherein the value of the numerical aperture $NA_L$, at the electrically-addressed type element side, of the relay lens, the predetermined pitch P of the pixel structure of the electrically-addressed type element, and the wavelength $\lambda$ of the light from the write light source further satisfy the following relationship: $NA_L/\lambda > 1/2P$.

16. A spatial light modulating device as claimed in claim 15, wherein the wavelength $\lambda$ of the light from the write light source has a wavelength width with a wavelength range of $\lambda_1 < \lambda < \lambda_2$, the value of the numerical aperture $NA_L$, at the electrically-addressed type element side, of the relay lens, the predetermined pitch P of the pixel structure of the electrically-addressed type element, and the wavelength range $\lambda_1, \lambda_2$ of the light from the write light source satisfying the following relationship: $1/2P < NA_L/\lambda_2$, $NA_L/\lambda < 1/P$.

17. A spatial light modulating device as claimed in claim 14, wherein the electrically-addressed type element includes a transmission type liquid crystal element.

18. A spatial light modulating device as claimed in claim 14, wherein the optically-addressed type spatial light modulator includes an optically-addressed type spatial light modulator that uses a photoconductive layer as the optical addressing layer and that uses a liquid crystal layer as the light modulation layer.

19. A spatial light modulating device, comprising:
a write light source for producing a write light;
an electrically-addressed type element, which has a pixel structure where a plurality of pixels are arranged at a predetermined pitch P, which is addressed by electric signals representing information to be written, and which is inputted with the light from the write light source;
an optically-addressed type spatial light modulator, which has an optical addressing layer and a light modulation layer between a pair of transparent electrodes; and
a read light source for producing a read light for the optically-addressed type spatial light modulator,
an output end of the electrically-addressed type element, that faces the optically-addressed type spatial light modulator, being constructed from a light transmission layer having a uniform refractive index, a write light input end of the optically-addressed type spatial light modulator, that faces the electrically-addressed type element, being constructed from a fiber optical plate which has a refractive index distribution for transferring an input image while maintaining a resolution of the input image, the light transmission layer and the fiber optical plate being optically connected with each other,
a numerical aperture $NA_{FOP}$ of the fiber optical plate, the predetermined pitch P of the pixel structure of the electrically-addressed type element, a thickness d of the light transmission layer, and a refractive index $n_G$ of the light transmission layer to a wavelength $\lambda$ of the light from the write light source satisfying the following relationship: $NA_{FOP} > n_G \cdot P/d$.

20. A spatial light modulating device as claimed in claim 19, wherein the numerical aperture $NA_{FOP}$ of the fiber optical plate, the predetermined pitch P of the pixel structure of the electrically-addressed type element, the thickness d of the light transmission layer, and the refractive index $n_G$ of the light transmission layer to the wavelength $\lambda$ of the light from the write light source further satisfy the following relationship: $NA_{FOP} < 2n_G \cdot P/d$.

21. A spatial light modulating device as claimed in claim 19, wherein the electrically-addressed type element includes a transmission type liquid crystal element.

22. A spatial light modulating device as claimed in claim 19, wherein the optically-addressed type spatial light modulator includes an optically-addressed type spatial light modulator that uses a photoconductive layer as the optical addressing layer and that uses a liquid crystal layer as the light modulation layer.

23. A spatial light modulating method, comprising the steps of:
    addressing, by electric signals representing information to be written, an electrically-addressed type spatial light modulator, which has a pixel structure where a plurality of pixels are arranged at a predetermined pitch P;
    inputting a write light with a predetermined wavelength $\lambda$ to the electrically-addressed type spatial light modulator, and guiding the write light, which has been modulated by the electrically-addressed type spatial light modulator and which has been outputted therefrom, to an optical addressing layer of an optically-addressed type spatial light modulator via an optical connecting element having a critical transfer spatial frequency $v_c$, the optically-addressed type spatial light modulator having the optical addressing layer and a light modulation layer between a pair of transparent electrodes; and
    inputting a read light to the light modulation layer of the optically-addressed type spatial light modulator, thereby allowing the read light to be modulated,
    the value of the critical transfer spatial frequency $v_c$ of the optical connecting element and the value of a pixel structure spatial frequency 1/P of the pixel structure in the electrically-addressed type spatial light modulator satisfying the following relationship: $v_c < 1/P$.

24. A spatial light modulating method as claimed in claim 23, wherein the value of the critical transfer spatial frequency $v_c$ of the optical connecting element and the value of the pixel structure spatial frequency 1/P satisfy the following relationship: $1/2P < v_c$.

25. A spatial light modulating method as claimed in claim 24, wherein the value of the critical transfer spatial frequency $v_c$ of the optical connecting element is determined based on a numerical aperture NA of the optical connecting element and the predetermined wavelength $\lambda$.

26. A spatial light modulating method as claimed in claim 25, wherein the optical connecting element includes a relay lens that has a numerical aperture $NA_L$ at a side of the electrically-addressed type spatial light modulator, the value of the critical transfer spatial frequency $v_c$ being equal to $NA_L \lambda$.

27. A spatial light modulating method as claimed in claim 25, wherein the optical connecting element includes a light transmission layer and a fiber optical plate which are connected with each other, the light transmission layer being connected to the electrically-addressed type spatial light modulator, the fiber optical plate being connected to the optically-addressed type spatial light modulator, the fiber optical plate having a numerical aperture $NA_{FOP}$, the light transmission layer having a thickness d and having a predetermined refractive index $n_G$ to the predetermined wavelength $\lambda$, the value of the critical transfer spatial frequency $v_c$ being substantially equal to $n_G/(d \cdot NA_{FOP})$.

28. A spatial light modulating method, comprising the steps of:
    addressing, by electric signals representing information to be written, an electrically-addressed type element, which has a pixel structure where a plurality of pixels are arranged at a predetermined pitch P;
    inputting a write light with a predetermined wavelength $\lambda$ to the electrically-addressed type element, and guiding the write light, which has been modulated by the electrically-addressed type element and which has been outputted therefrom, to an optical addressing layer of an optically-addressed type spatial light modulator via a relay lens having a numerical aperture $NA_L$ at a side of the electrically-addressed type element, the optically-addressed type spatial light modulator having the optical addressing layer and a light modulation layer between a pair of transparent electrodes; and
    inputting a read light to the light modulation layer of the optically-addressed type spatial light modulator, thereby allowing the read light to be modulated,
    the value of the numerical aperture $NA_L$, at the side of the electrically-addressed type element, of the relay lens, the predetermined pitch P of the pixel structure of the electrically-addressed type element, and the wavelength $\lambda$ of the write light satisfying the following relationship: $NA_L/\lambda < 1/P$.

29. A spatial light modulating method as claimed in claim 28, wherein the value of the numerical aperture $NA_L$, at the electrically-addressed type element side, of the relay lens, the predetermined pitch P of the pixel structure of the electrically-addressed type element, and the wavelength $\lambda$ of the light from the write light source further satisfy the following relationship: $NA_L/\lambda > 1/2P$.

30. A spatial light modulating method as claimed in claim 29, wherein the write light inputting step includes the step of inputting write light having a wavelength width with a wavelength range of $\lambda_1 < \lambda < \lambda_2$ to the electrically-addressed type element, the value of the numerical aperture $NA_L$, at the electrically-addressed type element side, of the relay lens, the predetermined pitch P of the pixel structure of the electrically-addressed type element, and the wavelength range $\lambda_1$, $\lambda_2$ of the write light satisfying the following relationship: $1/2P < NA_L/\lambda_2$, $NA_L/\lambda_1 < 1/P$.

31. A spatial light modulating method as claimed in claim 28, wherein the electrically-addressed type element includes a transmission type liquid crystal element.

32. A spatial light modulating method as claimed in claim 28, wherein the optically-addressed type spatial light modulator includes an optically-addressed type spatial light modulator that uses a photoconductive layer as the optical addressing layer and that uses a liquid crystal layer as the light modulation layer.

33. A spatial light modulating method, comprising the steps of:
    addressing, by electric signals representing information to be written, an electrically-addressed type element, which has a pixel structure where a plurality of pixels are arranged at a predetermined pitch P;

inputting a write light with a predetermined wavelength λ to the electrically-addressed type element, and guiding the write light, which has been modulated by the electrically-addressed type element and which has been outputted therefrom, to an optical addressing layer of an optically-addressed type spatial light modulator, via a light transmission layer, which has a thickness d and which has a refractive index $n_G$ to the predetermined wavelength λ, and a fiber optical plate, which has a numerical aperture $NA_{FOP}$, the optically-addressed type spatial light modulator having the optical addressing layer and a light modulation layer between a pair of transparent electrodes; and inputting a read light to the light modulation layer of the optically-addressed type spatial light modulator, thereby allowing the read light to be modulated, the numerical aperture $NA_{FOP}$ of the fiber optical plate, the predetermined pitch P of the pixel structure of the electrically-addressed type element, the thickness d of the light transmission layer, and the refractive index $n_G$ of the light transmission layer to the predetermined wavelength λ of write light satisfying the following relationship: $NA_{FOP} > n_G \cdot P/d$.

34. A spatial light modulating method as claimed in claim 33, wherein the numerical aperture $NA_{FOP}$ of the fiber optical plate, the predetermined pitch P of the pixel structure of the electrically-addressed type element, the thickness d of the light transmission layer, and the refractive index $n_G$ of the light transmission layer to the predetermined wavelength λ of the write light further satisfy the following relationship: $NA_{FOP} < 2n_G \cdot P/d$.

35. A spatial light modulating method as claimed in claim 33, wherein the electrically-addressed type element includes a transmission type liquid crystal element.

36. A spatial light modulating method as claimed in claim 33, wherein the optically-addressed type spatial light modulator includes an optically-addressed type spatial light modulator that uses a photoconductive layer as the optical addressing layer and that uses a liquid crystal layer as the light modulation layer.

* * * * *